United States Patent
Tarama et al.

(10) Patent No.: US 9,573,052 B2
(45) Date of Patent: Feb. 21, 2017

(54) GAME DEVICE, CONTROL METHOD FOR A GAME DEVICE, AND NON-TRANSITORY INFORMATION STORAGE MEDIUM

(75) Inventors: Naoki Tarama, Suita (JP); Manabu Hazama, Chiyoda-ku (JP); Hayana Honda, Nakano-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 594 days.

(21) Appl. No.: 13/614,598

(22) Filed: Sep. 13, 2012

(65) Prior Publication Data

US 2013/0194182 A1 Aug. 1, 2013

(30) Foreign Application Priority Data

Jan. 31, 2012 (JP) ................................. 2012-019315
Jan. 31, 2012 (JP) ................................. 2012-019316
Jan. 31, 2012 (JP) ................................. 2012-019317

(51) Int. Cl.

| G06F 3/033 | (2013.01) |
| A63F 13/213 | (2014.01) |
| A63F 13/5375 | (2014.01) |
| A63F 13/814 | (2014.01) |
| A63F 13/42 | (2014.01) |
| A63F 13/20 | (2014.01) |
| A63F 13/40 | (2014.01) |

(52) U.S. Cl.
CPC ............. *A63F 13/213* (2014.09); *A63F 13/06* (2013.01); *A63F 13/10* (2013.01); *A63F 13/42* (2014.09); *A63F 13/5375* (2014.09); *A63F 13/814* (2014.09); *A63F 2300/1093* (2013.01); *A63F 2300/6045* (2013.01); *A63F 2300/646* (2013.01); *A63F 2300/6607* (2013.01); *A63F 2300/695* (2013.01)

(58) Field of Classification Search
USPC ........................................ 463/30, 35, 36, 37
See application file for complete search history.

(56) References Cited

U.S. PATENT DOCUMENTS

| 2001/0016510 A1* | 8/2001 | Ishikawa et al. ................. 463/7 |
| 2010/0197391 A1* | 8/2010 | Geiss .............................. 463/30 |
| 2011/0058709 A1* | 3/2011 | Kipman et al. ............... 382/103 |
| 2011/0306468 A1* | 12/2011 | Wilson et al. .................... 482/8 |

FOREIGN PATENT DOCUMENTS

JP        2001-231904 A       8/2001

* cited by examiner

*Primary Examiner* — Paul A D'Agostino
*Assistant Examiner* — Brandon Gray
(74) *Attorney, Agent, or Firm* — Sughrue Mion, PLLC

(57) ABSTRACT

A position information acquiring unit acquires position information relating to positions of a plurality of body parts of a player. A determination unit determines whether or not the at least one of the plurality of body parts exists within a determination region including the reference position at a time point corresponding to the reference time. A body part information acquiring unit acquires body part information relating to a kind of the at least one of the plurality of body parts determined to exist within the determination region. An evaluation unit evaluates gameplay of the player based on the kind of the at least one of the plurality of body parts acquired by the body part information acquiring unit.

39 Claims, 21 Drawing Sheets

FIG.5

| BODY PART | THREE-DIMENSIONAL COORDINATES |
|---|---|
| HEAD | $P1(X_{P1}, Y_{P1}, Z_{P1})$ |
| SHOULDER CENTER | $P2(X_{P2}, Y_{P2}, Z_{P2})$ |
| LEFT SHOULDER | $P3(X_{P3}, Y_{P3}, Z_{P3})$ |
| RIGHT SHOULDER | $P4(X_{P4}, Y_{P4}, Z_{P4})$ |
| LEFT HAND | $P5(X_{P5}, Y_{P5}, Z_{P5})$ |
| RIGHT HAND | $P6(X_{P6}, Y_{P6}, Z_{P6})$ |
| BACK | $P7(X_{P7}, Y_{P7}, Z_{P7})$ |
| LEFT KNEE | $P8(X_{P8}, Y_{P8}, Z_{P8})$ |
| RIGHT KNEE | $P9(X_{P9}, Y_{P9}, Z_{P9})$ |
| LEFT FOOT | $P10(X_{P10}, Y_{P10}, Z_{P10})$ |
| RIGHT FOOT | $P11(X_{P11}, Y_{P11}, Z_{P11})$ |
| ⋮ | ⋮ |

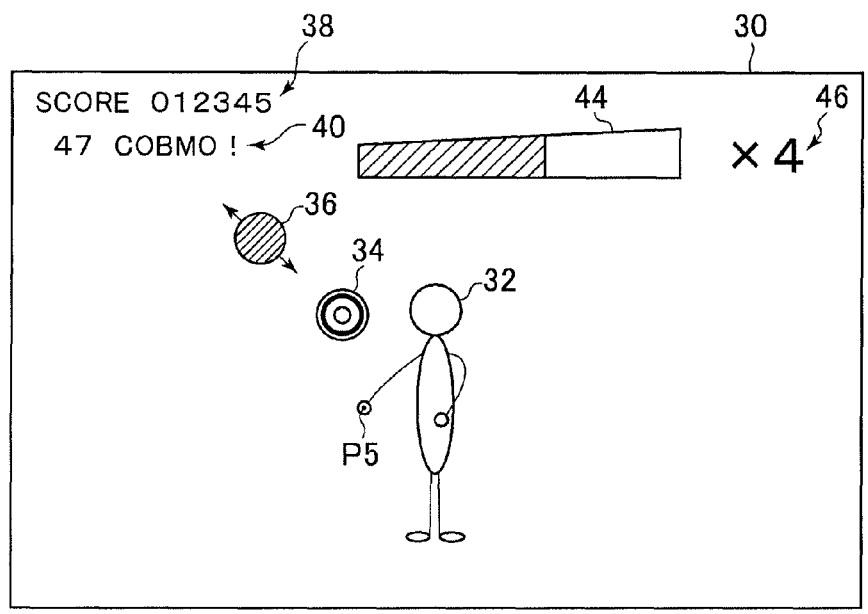
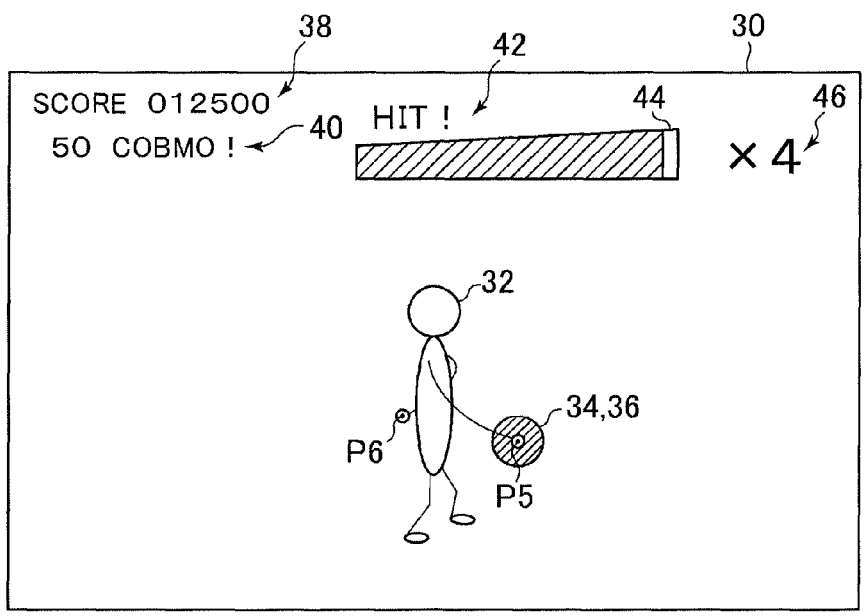

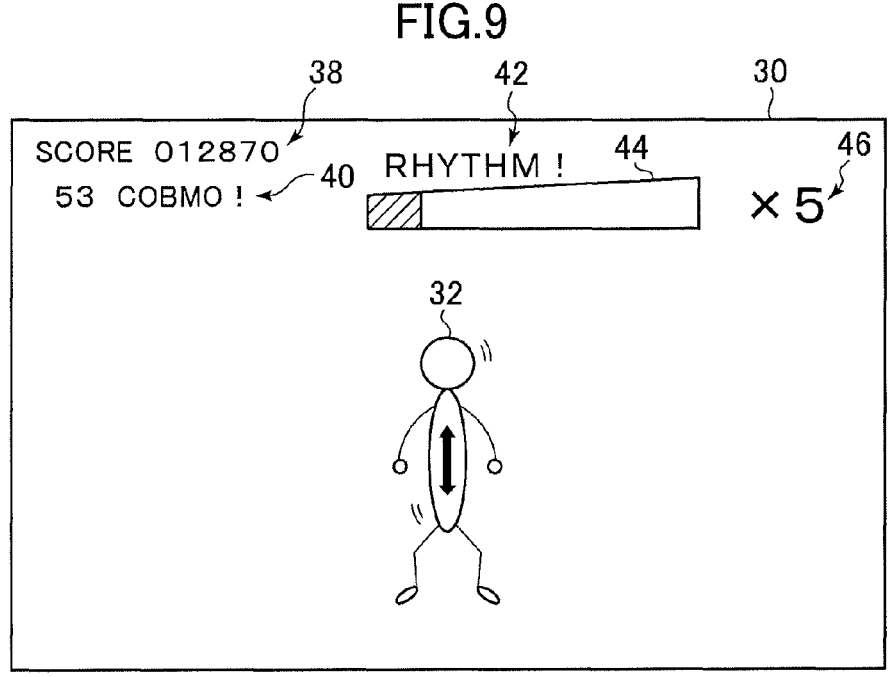
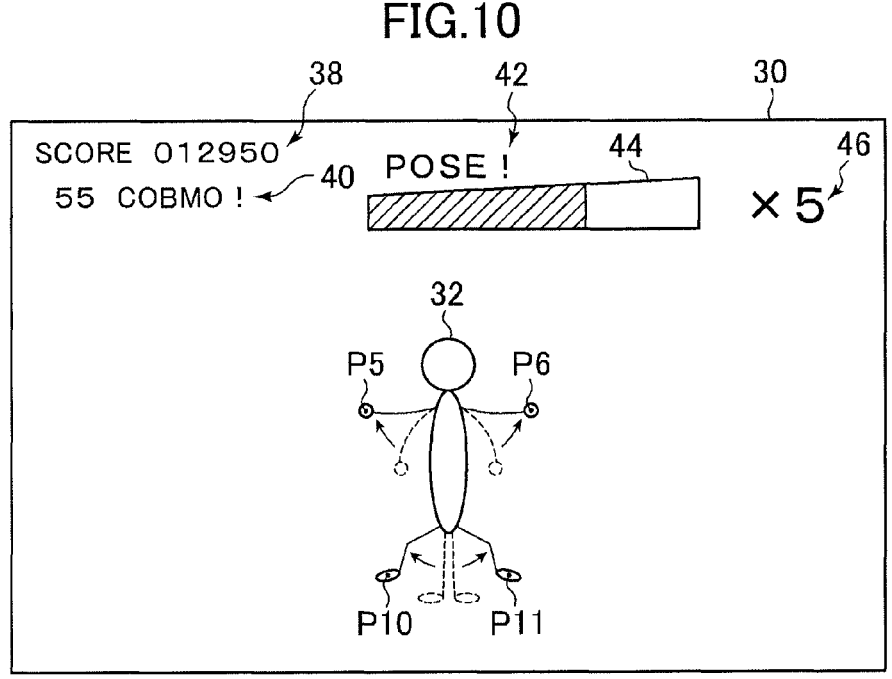

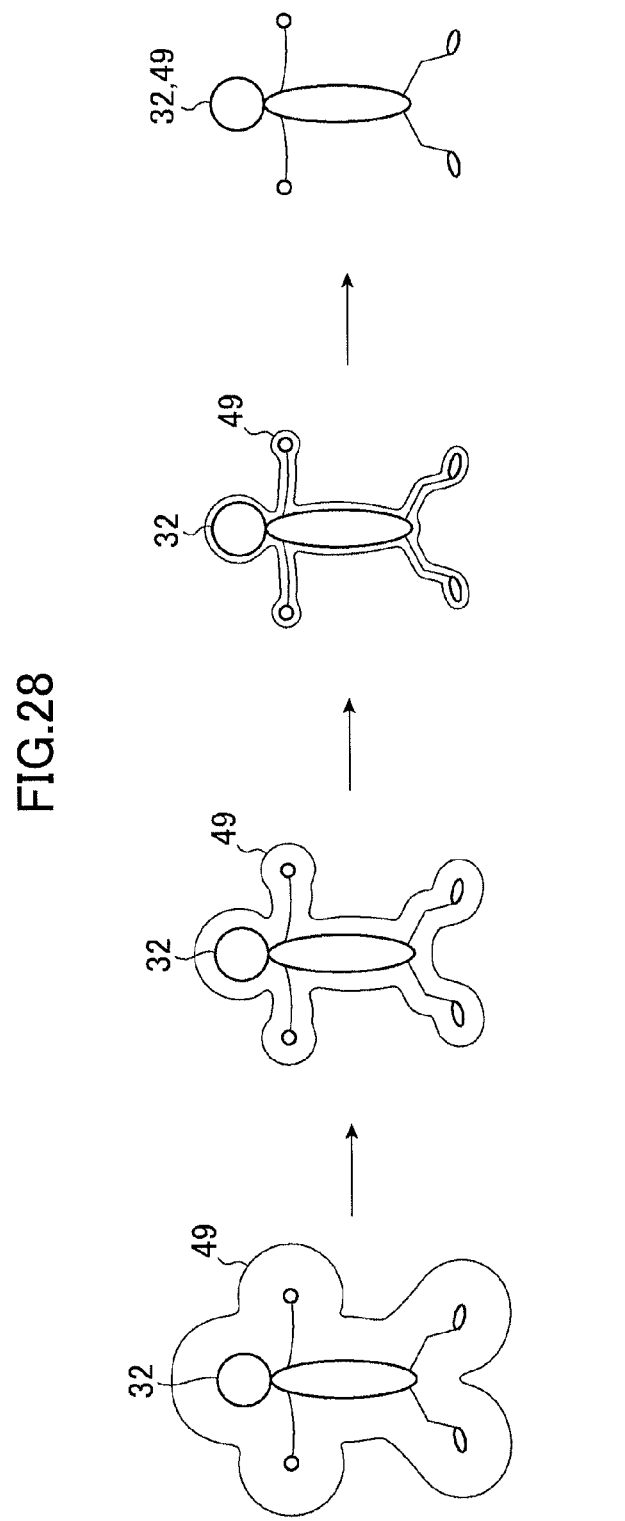

GAME DEVICE, CONTROL METHOD FOR A GAME DEVICE, AND NON-TRANSITORY INFORMATION STORAGE MEDIUM

CROSS-REFERENCE TO RELATED APPLICATION

The present application claims priority from Japanese applications JP 2012-019315 filed on Jan. 31, 2012, JP 2012-019316 filed on Jan. 31, 2012, and JP 2012-019317 filed on Jan. 31, 2012, the content of which is hereby incorporated by reference into these applications.

BACKGROUND OF THE INVENTION

1. Field of the Invention

The present invention relates to a game device, a control method for a game device, and a non-transitory information storage medium.

2. Description of the Related Art

Up to now, there is known a game configured so that a player aims to locate a body part in a given position at a given time. For example, Japanese Patent Application Laid-open No. 2001-231904 discloses a game device that executes a game configured so that a player aims to locate a foot on a button of a mat-type controller located at the foot in time with a music track.

SUMMARY OF THE INVENTION

However, with a technology disclosed in Japanese Patent Application Laid-open No. 2001-231904, gameplay is evaluated simply based on whether or not a body part of a player is located in a predetermined position at a given time, and hence the player receives the same evaluation in a case of using the body part that is hard to locate in the predetermined position as in a case of using the body part that is relatively easy to locate. For this reason, even if the player takes up a challenge by daring to use the body part that is hard to locate, the gameplay of the player is not accurately evaluated, which fails to satisfy the player.

The present invention has been made in view of the above-mentioned problem, and has an object to provide a game device, a control method for a game device, and a non-transitory information storage medium, which are capable of accurately evaluating gameplay of a player to give a feeling of satisfaction to the player.

In order to solve the above-mentioned problem, according to an exemplary embodiment of the present invention, there is provided a game device, which executes a game configured so that a player aims to locate at least one of a plurality of body parts of the player in a given position at a given time, including: position information acquiring means for acquiring position information relating to positions of the plurality of body parts of the player; means for acquiring reference data from means for storing the reference data obtained by associating a reference time with a reference position; determination means for determining whether or not the at least one of the plurality of body parts exists within a determination region including the reference position at a time point corresponding to the reference time; body part information acquiring means for acquiring body part information relating to a kind of the at least one of the plurality of body parts determined to exist within the determination region; and evaluation means for evaluating gameplay of the player based on the kind of the at least one of the plurality of body parts acquired by the body part information acquiring means.

According to an exemplary embodiment of the present invention, there is also provided a control method for a game device, which executes a game configured so that a player aims to locate at least one of a plurality of body parts of the player in a given position at a given time, the control method including: acquiring position information relating to positions of the plurality of body parts of the player; acquiring reference data from means for storing the reference data obtained by associating a reference time with a reference position; determining whether or not the at least one of the plurality of body parts exists within a determination region including the reference position at a time point corresponding to the reference time; acquiring body part information relating to a kind of the at least one of the plurality of body parts determined to exist within the determination region; and evaluating gameplay of the player based on the kind of the at least one of the plurality of body parts acquired in the acquiring of the body part information acquiring means.

According to an exemplary embodiment of the present invention, there is further provided a program for causing a computer to function as a game device, which executes a game configured so that a player aims to locate at least one of a plurality of body parts of the player in a given position at a given time, the program further causing the computer to function as: position information acquiring means for acquiring position information relating to positions of the plurality of body parts of the player; means for acquiring reference data from means for storing the reference data obtained by associating a reference time with a reference position; determination means for determining whether or not the at least one of the plurality of body parts exists within a determination region including the reference position at a time point corresponding to the reference time; body part information acquiring means for acquiring body part information relating to a kind of the at least one of the plurality of body parts determined to exist within the determination region; and evaluation means for evaluating gameplay of the player based on the kind of the at least one of the plurality of body parts acquired by the body part information acquiring means.

According to an exemplary embodiment the present invention, there is further provided a computer-readable non-transitory information storage medium having the above-mentioned program recorded thereon.

According to the exemplary embodiments of the present invention, it is possible to accurately evaluating the gameplay of the player to give the feeling of satisfaction to the player.

Further, according to the exemplary embodiment of the present invention, the determination means determines whether or not at least two of the plurality of body parts exist within the determination region at the time point corresponding to the reference time, the body part information acquiring means acquires the body part information relating to a combination of the kinds of the at least two of the plurality of body parts determined to exist within the determination region, and the evaluation means evaluates the gameplay of the player based on the combination of the kinds of the at least two of the plurality of body parts acquired by the body part information acquiring means.

Further, according to the exemplary embodiment of the present invention, the reference data is associated with a corresponding one of the plurality of body parts included in one of an upper limb and a lower limb on one side of the player corresponding to the reference position, and the evaluation means gives a better evaluation to the player in a case where the at least one of the plurality of body parts acquired by the body part information acquiring means is a body part included in one of the upper limb and the lower limb on an opposite side to the one side, than in a case where the at least one of the plurality of body parts acquired by the body part information acquiring means is a body part included in one of the upper limb and the lower limb on the one side.

Further, according to the exemplary embodiment of the present invention, the game device further includes: means for displaying an image for showing the player the reference time and the reference position on a display screen; means for changing a display mode of the image based on an evaluation result obtained by the evaluation means; and means for determining a method of changing the display mode of the image based on the kind of the at least one of the plurality of body parts acquired by the body part information acquiring means.

Further, according to the exemplary embodiment of the present invention, the evaluation means includes: means for changing a score of the player based on a determination result obtained by the determination means; and means for determining a change amount of the score of the player based on the kind of the at least one of the plurality of body parts acquired by the body part information acquiring means, and the evaluation means evaluates the gameplay of the player by changing the score of the player by the determined change amount.

Further, according to the exemplary embodiment of the present invention, the reference position is a position which is set in a real space, the position information acquiring means acquires the position information relating to the positions within the real space of the plurality of body parts, and the determination means determines whether or not the position within the real space of the at least one of the plurality of body parts falls within the determination region including the reference position which is set in the real space at the time point corresponding to the reference time.

Further, according to the exemplary embodiment of the present invention, the reference position is a position which is set within one of a display screen and a virtual space, the position information acquiring means acquires the position information relating to the positions within the one of the display screen and the virtual space of the plurality of body parts corresponding to the positions within a real space of the plurality of body parts, and the determination means determines whether or not the position within the one of the display screen and the virtual space of the at least one of the plurality of body parts corresponding to the position within the real space of the at least one of the plurality of body parts falls within the determination region including the reference position which is set within the one of the display screen and the virtual space at the time point corresponding to the reference time.

Further, according to the exemplary embodiment of the present invention, the determination means determines whether or not the at least one of the plurality of body parts exists within the determination region including the reference position at the reference time, and the body part information acquiring means acquires the body part information relating to the kind of the at least one of the plurality of body parts of the player determined to exist within the determination region at the reference time.

Further, according to the exemplary embodiment of the present invention, the determination means includes: means for determining whether or not the at least one of the plurality of body parts within a period corresponding to the reference time exists within the determination region including the reference position; and means for determining whether or not a lag between the reference time and a time at which the at least one of the plurality of body parts is located within the determination region is equal to or smaller than a predetermined value, and the body part information acquiring means acquires the body part information relating to the kind of the at least one of the plurality of body parts in a case where the lag between the reference time and the time at which the at least one of the plurality of body parts is located within the determination region is determined to be equal to or smaller than the predetermined value.

Further, according to the exemplary embodiment of the present invention, the game is a game configured so that the player moves the body part of the player in time with a music track, and the game device further includes: action determination means for determining whether or not an action of changing a direction of the body part has been performed by the player based on a change in position of the body part; direction change time acquiring means for acquiring a direction change time for the body part during the action; and time comparison means for comparing the direction change time with a time defined based on a beat of the music track, and the evaluation means evaluates the gameplay of the player based on a comparison result obtained by the time comparison means.

Further, according to the exemplary embodiment of the present invention, the action determination means determines whether or not reciprocation of the body part has been performed by the player based on the change in position of the body part, the direction change time acquiring means acquires a turning-back time at which the body part turns back during the reciprocation as the direction change time, and the time comparison means compares the turning-back time with the time defined based on the beat of the music track.

Further, according to the exemplary embodiment of the present invention, the game device further includes movement amount determination means for determining whether or not a movement amount of the body part between one direction change time and a subsequent direction change time thereto is equal to or larger than a reference amount, based on the change in position of the body part, in which the evaluation means evaluates the gameplay of the player based on a determination result obtained by the movement amount determination means and the comparison result obtained by the time comparison means.

Further, according to the exemplary embodiment of the present invention, the game device further includes means for setting the reference amount based on a tempo of the music track.

Further, according to the exemplary embodiment of the present invention, the game device further includes: restriction means for restricting execution of evaluation processing performed by the evaluation means; means for determining whether or not a state in which a lag between the direction change time and the time defined based on the beat of the music track is equal to or smaller than a reference value has been maintained for a predetermined period; and means for lifting restriction performed by the restriction means in a case where it is determined that the state in which the lag is equal to or smaller than the reference value has been maintained for the predetermined period.

Further, according to the exemplary embodiment of the present invention, the game device further includes: means for displaying one of a player image and a character on a display screen, the player image being obtained by continuously photographing the player by photographing means, the character performing an action corresponding to the action of the player based on the position information; and means for displaying a given image in a position corresponding to the body part of the one of the player image and the character based on the comparison result obtained by the time comparison means.

Further, according to the exemplary embodiment of the present invention, the game is a game configured so that the player aims to locate the body part in the given position at the given time in time with the music track, the position information acquiring means acquires the position information relating to the positions of the plurality of body parts of the player, and the game device further includes: the means for acquiring the reference data from the means for storing the reference data obtained by associating the reference time with the reference position; and position comparison means for comparing the position of the at least one of the plurality of body parts at the time point corresponding to the reference time with the reference position, the action determination means determines whether or not the action of changing the direction of the at least one of the plurality of body parts has been performed by the player, based on the change in position of the at least one of the plurality of body parts, and the evaluation means evaluates the gameplay of the player based on a comparison result obtained by the position comparison means and the comparison result obtained by the time comparison means.

Further, according to the exemplary embodiment of the present invention, the game device further includes means for restricting one of execution of comparison processing performed by the position comparison means and execution of evaluation processing performed by the evaluation means based on the comparison result obtained by the time comparison means.

Further, according to the exemplary embodiment of the present invention, the evaluation means includes: means for changing a score of the player based on the comparison result obtained by the position comparison means; and means for determining a change amount of the score of the player based on a determination result obtained by the time comparison means, and the evaluation means evaluates the gameplay of the player by changing the score of the player by the determined change amount.

Further, according to the exemplary embodiment of the present invention, the position information acquiring means acquires information relating to the position within a real space of the body part of the player, and the action determination means determines whether or not the action of changing the direction of the body part has been performed by the player, based on the change in position within the real space of the body part.

Further, according to the exemplary embodiment of the present invention, the position information acquiring means acquires information relating to the position within one of a display screen and a virtual space of the body part of the player corresponding to the position within a real space of the body part of the player, and the action determination means determines whether or not the action of changing the direction of the body part has been performed by the player, based on the change in position within the one of the display screen and the virtual space of the body part of the player corresponding to the position within the real space of the body part of the player.

Further, according to the exemplary embodiment of the present invention, the game is a game configured so that the player moves the body part of the player in time with a music track, and the game device further includes: movement determination means for determining, based on the position information, whether or not the at least one of the plurality of body parts has moved at a speed equal to or faster than a reference speed; and stop determination means for determining based on the position information whether or not the at least one of the plurality of body parts that moved at the speed equal to or faster than the reference speed has maintained a substantially stopped state for a reference period after having moved in a case where it is determined that the at least one of the plurality of body parts has moved at the speed equal to or faster than the reference speed, and the evaluation means evaluates the gameplay of the player based on a determination result obtained by the stop determination means.

Further, according to the exemplary embodiment of the present invention, the game device further includes: means for displaying one of a player image and a character on a display screen, the player image being obtained by continuously photographing the player by photographing means, the character performing an action corresponding to the action of the player based on the position information; means for displaying an outline image having a shape corresponding one of an outline of the player image and an outline of the character in a position corresponding to the one of the player image and the character in a case where the at least one of the plurality of body parts that moved at the speed equal to or faster than the reference speed comes into the substantially stopped state after having moved; and outline image control means for gradually changing the outline image in size as a duration of the substantially stopped state increases.

Further, according to the exemplary embodiment of the present invention, the outline image control means further includes: first means for gradually changing the outline image in size based on the duration of the state in a case where the duration of the substantially stopped state has not reached the reference period; and second means for changing, in a case where the duration of the state reaches the reference period, the outline image in size at a faster speed than the first means and then erasing the outline image from the display screen.

Further, according to the exemplary embodiment of the present invention, the outline image control means further includes at least one of: means for gradually reducing the outline image, which is larger than the one of the player image and the character, based on the duration of the state so that, in a case where the duration of the substantially stopped state reaches the reference period, the outline image substantially coincides with the one of the outline of the player image and the outline of the character; and means for gradually increasing the outline image, which is smaller than the one of the player image and the character, based on the duration of the state so that, in a case where the duration of the substantially stopped state reaches the reference period, the outline image substantially coincides with the one of the outline of the player image and the outline of the character.

Further, according to the exemplary embodiment of the present invention, the game device further includes means for restricting, in a case where the at least one of the plurality of body parts that moved at the speed equal to or faster than the reference speed comes into the substantially stopped state after having moved and then stops maintaining the substantially stopped state before the duration of the substantially stopped state reaches the reference period, execution of display control processing on the outline image which is performed by the outline image control means and erasing the outline image from the display screen.

Further, according to the exemplary embodiment of the present invention, the game is a game configured so that a player aims to locate the body part in the given position at the given time in time with the music track, and the game device further includes: the means for acquiring the reference data from the means for storing the reference data obtained by associating the reference time with the reference position; and comparison means for comparing the position of the at least one of the plurality of body parts at the time point corresponding to the reference time with the reference position, the movement determination means determining, based on the position information, whether or not the at least one of the plurality of body parts moved at the speed equal to or faster than the reference speed between one reference time and a subsequent reference time thereto, the stop determination means determining whether or not the at least one of the plurality of body parts that moved at the speed equal to or faster than the reference speed maintained the substantially stopped state for the reference period after having moved between the one reference time and the subsequent reference time thereto, and the evaluation means evaluates the gameplay of the player based on a comparison result obtained by the comparison means and the determination result obtained by the stop determination means.

Further, according to the exemplary embodiment of the present invention, the evaluation means includes: means for changing a score of the player based on the comparison result obtained by the comparison means; and means for determining a change amount of the score of the player based on the determination result obtained by the stop determination means, and the evaluation means evaluates the gameplay of the player by changing the score of the player by the determined change amount.

Further, according to the exemplary embodiment of the present invention, the game device further includes means for restricting one of execution of comparison processing performed by the comparison means and execution of evaluation processing performed by the evaluation means in a case where it is not determined that the at least one of the plurality of body parts that moved at the speed equal to or faster than the reference speed has maintained the substantially stopped state for a period equal to or longer than the reference period after having moved.

Further, according to the exemplary embodiment of the present invention, the position information acquiring means acquires the position information relating to positions of at least one hand and at least one foot of the player, the movement determination means determines, based on the position information, whether or not the at least one hand and the at least one foot of the player have moved at the speed equal to or faster than the reference speed, and the stop determination means determines, based on the position information, whether or not the at least one hand and the at least one foot have maintained the substantially stopped state for the reference period after having moved in a case where it is determined that the at least one hand and the at least one foot of the player have moved at the speed equal to or faster than the reference speed.

Further, according to the exemplary embodiment of the present invention, the game device further includes means for determining, based on the position information, whether or not the at least one of the plurality of body parts is in the substantially stopped state, and the movement determination means determines, after it is determined that the at least one of the plurality of body parts is in the substantially stopped state, whether or not the at least one of the plurality of body parts that is in the substantially stopped state has moved at the speed equal to or faster than the reference speed.

Further, according to the exemplary embodiment of the present invention, the game device further includes means for setting the reference speed based on a tempo of the music track.

Further, according to the exemplary embodiment of the present invention, the game device further includes means for setting a length of the reference period based on a tempo of the music track.

Further, according to the exemplary embodiment of the present invention, the stop determination means includes means for determining whether or not the at least one of the plurality of body parts that moved at the speed equal to or faster than the reference speed is in the substantially stopped state by determining whether or not the at least one of the plurality of body parts exists within a range defined based on the position of the at least one of the plurality of body parts after having moved, and determines whether or not the at least one of the plurality of body parts has maintained the position within the range for the reference period.

Further, according to the exemplary embodiment of the present invention, the stop determination means includes means for determining whether or not the at least one of the plurality of body parts that moved at the speed equal to or faster than the reference speed is in the substantially stopped state by determining whether or not the at least one of the plurality of body parts has decelerated to a moving speed of substantially zero after having moved, and determines whether or not the at least one of the plurality of body parts has maintained the moving speed of substantially zero for the reference period.

Further, according to the exemplary embodiment of the present invention, the position information acquiring means acquires the position information relating to the positions within a real space of the plurality of body parts of the player, the movement determination means determines whether or not the player has moved the at least one of the plurality of body parts at the speed equal to or faster than the reference speed, based on the positions within the real space of the plurality of body parts, and the stop determination means determines, in a case where it is determined that the at least one of the plurality of body parts has been moved at the speed equal to or faster than the reference speed, whether or not the at least one of the plurality of body parts that moved at the speed equal to or faster than the reference speed has maintained the substantially stopped state for a period equal to or longer than the reference period, based on the position within the real space of the at least one of the plurality of body parts that moved at the speed equal to or faster than the reference speed.

Further, according to the exemplary embodiment of the present invention, the position information acquiring means acquires the position information relating to the positions within one of a display screen and a virtual space of the plurality of body parts of the player corresponding to the positions within a real space of the plurality of body parts of the player, the movement determination means determines whether or not the player has moved the at least one of the plurality of body parts at the speed equal to or faster than the reference speed, based on the positions within the one of the display screen and the virtual space of the plurality of body parts of the player corresponding to the positions within the real space of the plurality of body parts of the player, and the stop determination means determines, in a case where it is determined that the at least one of the plurality of body parts has been moved at the speed equal to or faster than the reference speed, whether or not the at least one of the plurality of body parts that moved at the speed equal to or faster than the reference speed has maintained the substantially stopped state for a period equal to or longer than the reference period, based on the position within the one of the display screen and the virtual space of the at least one of the plurality of body parts corresponding to the position within the real space of the at least one of the plurality of body parts that moved at the speed equal to or faster than the reference speed.

BRIEF DESCRIPTION OF THE DRAWINGS

In the accompanying drawings:

FIG. 5 is a diagram illustrating an example of player body part information generated by a position detecting device;

FIG. 7 is a diagram illustrating an example of a game screen;

FIG. 8 is a diagram illustrating an example of the game screen displayed in a case where a hit trick is performed;

FIG. 9 is a diagram illustrating an example of the game screen displayed in a case where a rhythm trick is being performed;

FIG. 10 is a diagram illustrating an example of the game screen displayed in a case where a pose trick is performed;

FIG. 28 is a diagram for illustrating a method of changing the size of the outline image according to Modified Example (3-2).

DETAILED DESCRIPTION OF THE INVENTION (1. Embodiment)

Hereinafter, detailed description is given of an example of an embodiment of the present invention with reference to the accompanying drawings. A case where a game device according to the embodiment of the present invention is applied to a consumer game machine (stationary game machine) is taken as an example, but the game device may be any kind of computer such as a portable game machine, a mobile phone (smartphone), or the like.

Figure 1:
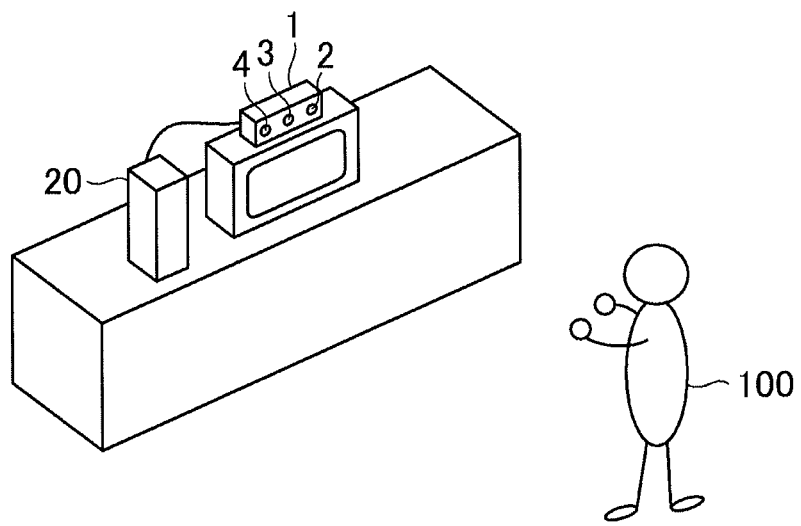
FIG. 1 is a diagram illustrating how a player plays a game.

FIG. 1 is a diagram illustrating how a player plays a game. As illustrated in FIG. 1, a player 100 is positioned, for example, in front of a position detecting device 1. The position detecting device 1 and a game device 20 are connected to each other so as to be able to communicate data therebetween.

(2. Operation of Position Detecting Device)

First, the position detecting device 1 is described. The position detecting device 1 generates player body part information relating to a position of the player in a real space. In this embodiment, description is given of a case where the player body part information includes information relating to positions of a plurality of body parts of the user 100. The body parts of the player 100 include, for example, a head and both arms.

As illustrated in FIG. 1, the position detecting device 1 includes, for example, a CCD camera 2, an infrared sensor 3, and a microphone 4 including a plurality of microphones.

The CCD camera 2 is a known camera including a CCD image sensor. For example, the CCD camera 2 generates a photographed image (for example, RGB digital image) by photographing the player 100 at predetermined time intervals (for example, every ¹⁄₆₀th of a second).

Figure 2:
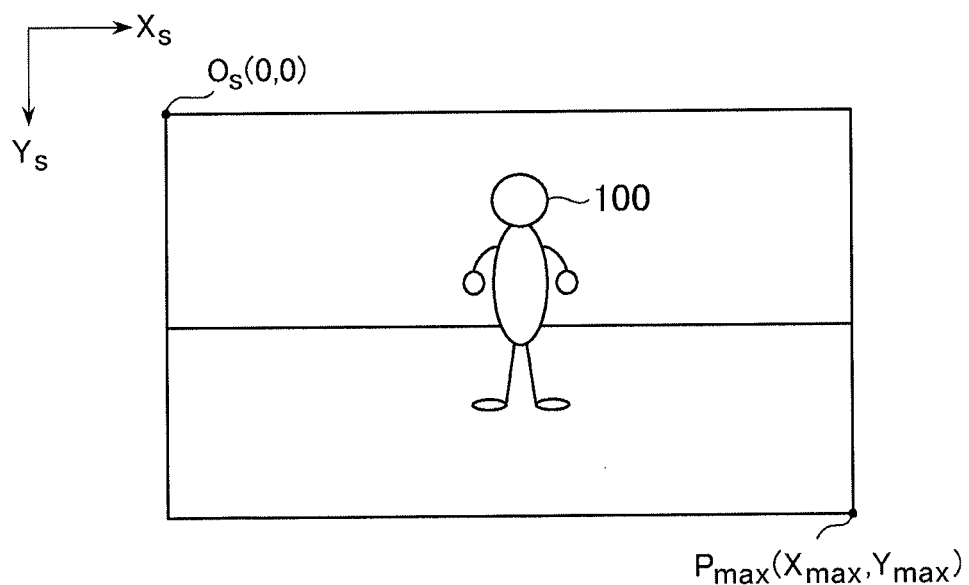
FIG. 2 is a diagram illustrating an example of a photographed image generated by a CCD camera.

FIG. 2 is a diagram illustrating an example of the photographed image generated by the CCD camera 2. As illustrated in FIG. 2, the photographed image includes, for example, the player 100. In the photographed image, there are set an Xs-axis and a Ys-axis, which are orthogonal to each other. For example, the upper left corner of the photographed image is set as an origin Os (0,0). Further, for example, the lower right corner of the photographed image is set as coordinates Pmax (Xmax, Ymax). The position of each pixel in the photographed image is identified by two-dimensional coordinates (Xs-Ys coordinates) that are assigned to each pixel.

The infrared sensor 3 is formed of, for example, an infrared emitting device and an infrared receiving device (for example, infrared diodes). The infrared sensor 3 detects reflected light obtained by emitting infrared light. The infrared sensor 3 measures the depth of a subject (for example, player 100) based on a detection result of the reflected light.

The depth of a subject is a distance between a measurement reference position and the position of the subject. The measurement reference position is a position that serves as a reference in measuring the depth (perspective) of the position of the player 100. The measurement reference position may be a predetermined position associated with the position of the position detecting device 1, such as the position of the infrared receiving device of the infrared sensor 3. The infrared sensor 3 measures the depth of the player 100 based, for example, on a time of flight (TOF), which is a time required for the infrared sensor 3 to receive reflected light after emitting infrared light.

Figure 3:
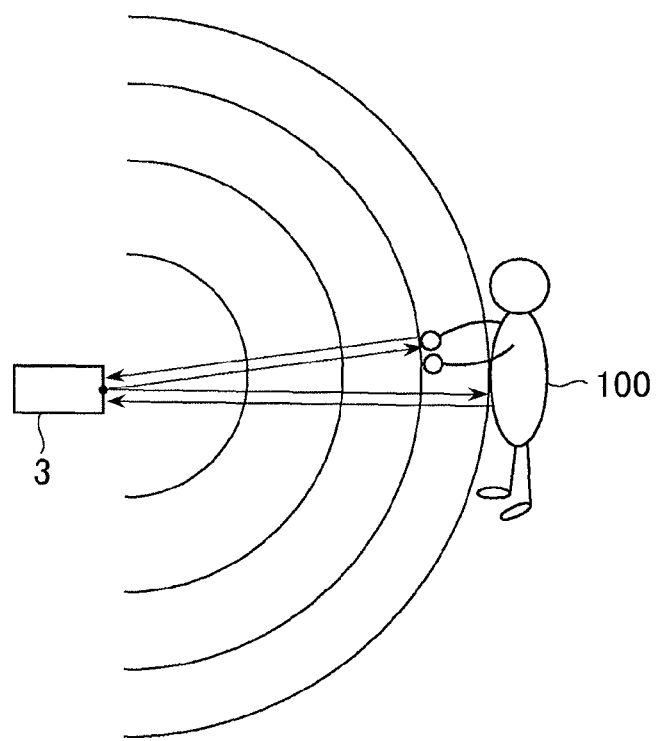
FIG. 3 is a diagram illustrating a method of measuring a depth of a player, which is performed by an infrared sensor.

FIG. 3 is a diagram for describing a method of measuring the depth of the player 100, which is performed by the infrared sensor 3. As illustrated in FIG. 3, the infrared sensor 3 emits pulsed infrared light at predetermined intervals. The infrared light emitted from the infrared sensor 3 spreads spherically with an emission position of the infrared sensor 3 at the center.

The infrared light emitted from the infrared sensor 3 strikes, for example, surfaces of the body of the player 100. The infrared light that has struck those surfaces is reflected. The reflected infrared light is detected by the infrared receiving device of the infrared sensor 3. Specifically, the infrared sensor 3 detects reflected light having a phase shifted by 180° from that of the emitted infrared light.

For example, as illustrated in FIG. 3, in a case where the player 100 is holding out both hands, those held-out hands are closer to the infrared sensor 3 than the torso of the player 100. Specifically, the TOF of the infrared light reflected by both hands of the player 100 is shorter than the TOF of the infrared light reflected by the torso of the player 100.

The value determined as follows corresponds to the distance between the measurement reference position and the player 100 (that is, depth). Specifically, the value is determined by multiplying a time required for the infrared sensor 3 to detect the reflected light after emitting the infrared light (that is, TOF) by the speed of the infrared light and then dividing the resultant value by two. In this manner, the infrared sensor 3 can measure the depth of the player 100.

Further, the infrared sensor 3 also detects an outline of a subject (player 100) by detecting depth differences acquired from the reflected infrared light. The fact that the infrared sensor 3 receives the reflected infrared light as described above means that an object is located at that place. Further, if there is no other object located behind the object in vicinity, the depth difference between the object and the surroundings of the object is large. For example, the infrared sensor 3 detects the outline of the player 100 by joining portions having the depth differences larger than a predetermined value.

Note that, the method of detecting the outline of the player 100 is not limited to the above-mentioned example. Alternatively, for example, the outline may be detected based on the brightness of each pixel of the photographed image acquired by the CCD camera 2. In this case, it is equally possible to detect the outline of the player 100 by, for example, joining portions having large brightness differences among the pixels.

Information relating to the depth of the player 100 (depth information), which is detected as described above, is expressed as, for example, a depth image. In this embodiment, description is given by taking, as an example, a case where the depth information is expressed as a gray-scale depth image (for example, 256-bit gray-scale image data).

Figure 4:
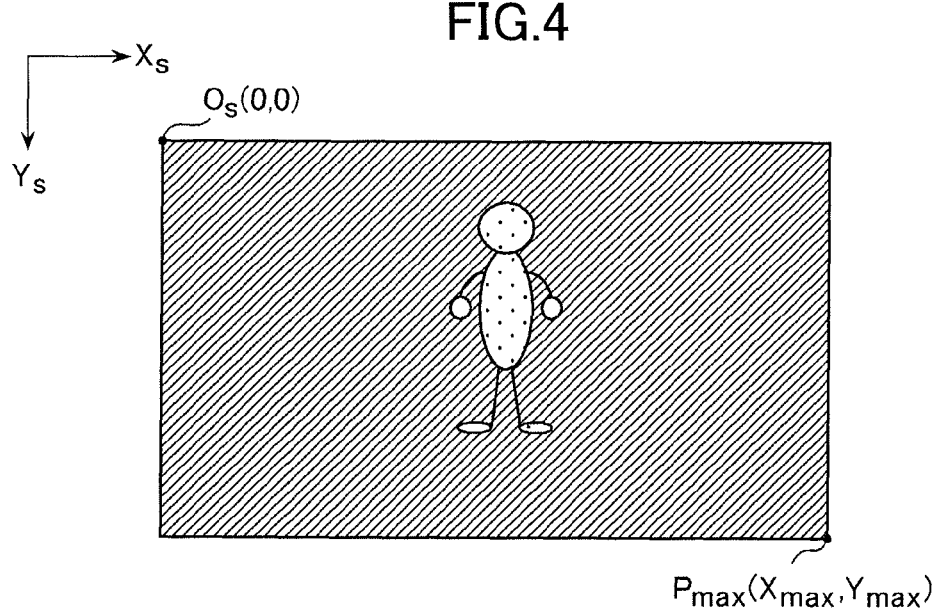
FIG. 4 is a diagram illustrating an example of a depth image obtained by the infrared sensor.

FIG. 4 is a diagram illustrating an example of the depth image acquired by the infrared sensor 3. As illustrated in FIG. 4, for example, an object located close to the infrared sensor 3 is expressed as bright (brightness is high), and an object located far from the infrared sensor 3 is expressed as dark (brightness is low). The depth of the player 100 corresponds to the brightness (pixel value) of the depth image.

For example, in a case where the depth image is expressed as the 256-bit gray-scale image data, for every 2-cm change in depth of the player 100, the depth image is changed in brightness by one bit. This case means that the infrared sensor 3 is capable of detecting the depth of the subject in units of 2 cm. In the case where the player 100 is holding out both hands forward (FIG. 3), as illustrated in FIG. 4, pixels corresponding to both hands of the player 100 are expressed as brighter (brightness is higher) than pixels corresponding to the torso.

In this embodiment, similarly to the CCD camera 2, the infrared sensor 3 generates the depth image at predetermined time intervals (for example, every 1/60th of a second). Based on the photographed image acquired by the CCD camera 2 and the depth image acquired by the infrared sensor 3, the player body part information is generated relating to the positions of body parts of the player 100.

For example, there is generated such a composite image (RGBD data) that is obtained by adding the depth information (D: depth) indicated by the depth image to the photographed image (RGB data) acquired by the CCD camera 2. In other words, the composite image contains, for each pixel, color information (lightness of each of R, G, and B) and the depth information.

In a case where player body part information is generated based on the composite image, first, based on the depth image, pixels corresponding to the outline of the player 100 are identified. Next, in the composite image, the color information (lightness of R, G, and B) of pixels enclosed within the outline is referred to. Based on the color information of the composite image, pixels corresponding to each part of the body of the player 100 are identified. For this identification method, for example, a known method is applicable, such as a pattern matching method in which the object (that is, each part of the body of the player 100) is extracted from the image through a comparison with a comparison image (training image).

Based on the pixel values (RGBD values) of the pixels identified as described above, sets of the three-dimensional coordinates of the head, shoulders, etc. of the player 100 are calculated. For example, the three-dimensional coordinates are generated by carrying out predetermined matrix transformation processing on those pixel values. The matrix transformation processing is executed through, for example, a matrix operation similar to transformation processing performed in 3D graphics between two coordinate systems of a world coordinate system and a screen coordinate system. Specifically, the RGB value indicating the color information of the pixel and the D value indicating the perspective are substituted into a predetermined determinant, to thereby calculate the three-dimensional coordinate of the pixel.

Note that, for the method of calculating the three-dimensional coordinate that corresponds to a pixel based on the pixel value (RGBD value), a known method may be applied, and the calculation method is not limited to the above-mentioned example. Alternatively, for example, the coordinate transformation may be performed through the use of a lookup table.

FIG. 5 is a diagram illustrating an example of the player body part information generated by the position detecting device 1. As illustrated in FIG. 5, the player body part information includes a plurality of pieces of information relating to positions of a plurality of body parts of the player 100. As the player body part information, for example, each part of the player 100 and the three-dimensional coordinates are stored in association with each other.

Figure 6:
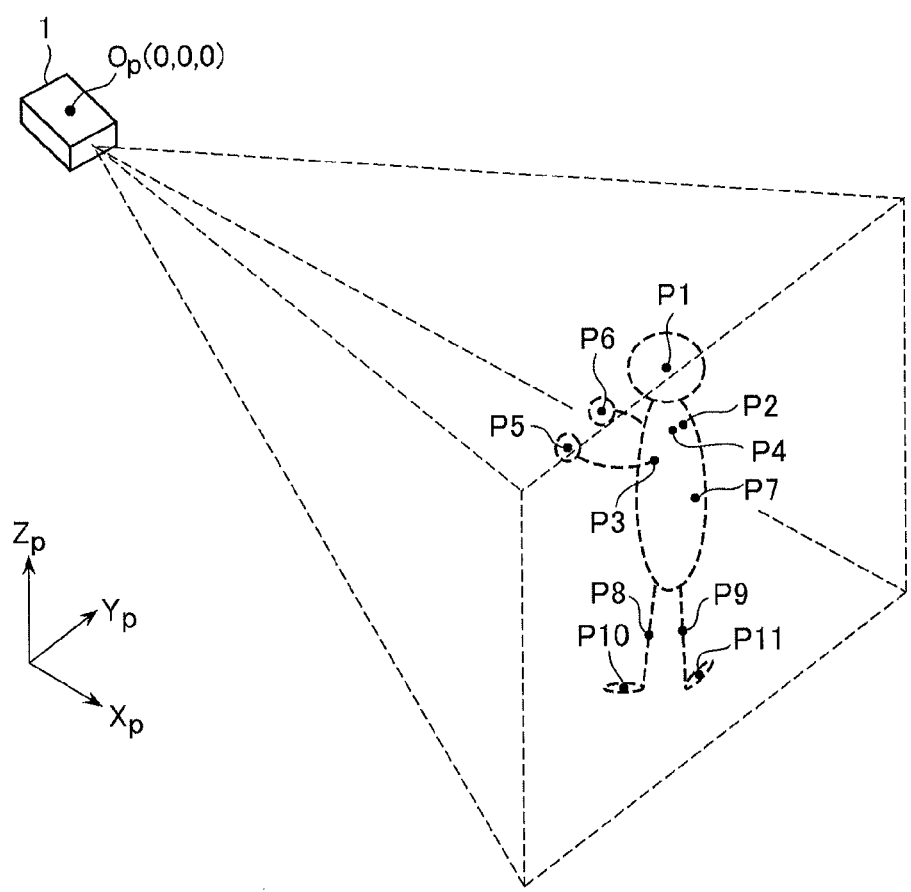
FIG. 6 is a diagram illustrating a position of the player, which is identified by the player body part information.

FIG. 6 is a diagram illustrating the position of the player 100, which is identified by the player body part information. In this embodiment, for example, a predetermined position corresponding to the position detecting device 1 (for example, the measurement reference position) is set as an origin Op. For example, the origin Op represents the three-dimensional coordinates corresponding to the measurement reference position of the infrared sensor 3. Note that, the position of the origin Op may be set anywhere in the three-dimensional space in which the player 100 exists. For example, the three-dimensional coordinates corresponding to the origin Os of the photographed image may be set as the origin Op.

As illustrated in FIG. 6, for example, the player body part information includes eleven sets of three-dimensional coordinates corresponding to a head P1, center of shoulders P2, left shoulder P3, right shoulder P4, left hand P5, right hand P6, back P7, left knee P8, right knee P9, left foot P10, and right foot P11 of the player 100.

Note that, the part of the body of the player 100, which is indicated by the player body part information, may be a part that is determined in advance from the player's body (skeletal frame). For example, any part of the body may be used as long as the part is identifiable by the above-mentioned pattern matching method.

For example, the player body part information generated every predetermined time interval (for example, every 1/60th of a second) is transmitted from the position detecting device 1 to the game device 20. The game device 20 receives the player body part information from the position detecting device 1, to thereby identify the positions of respective body parts of the player (hereinafter, reference numeral "100" of the player is omitted) and then executes various kinds of processing based on a movement of the body parts of the player.

(3. Summary of the Game Executed on the Game Device)

The game device 20 executes a game configured so that a player aims to locate a body part in a given position at a given time. In this case, a game configured so that the score of the player increases in a case where the player locates their hand or foot in a given position in time with the music track is executed. In a case where the game is started, the music track is output from the game device 20, and the game screen is displayed.

FIG. 7 is a diagram illustrating an example of the game screen. As illustrated in FIG. 7, a character 32 that performs an action corresponding to the action of the player is displayed on a game screen 30. The position of each body part of the character 32 changes based on a change in three-dimensional coordinates of each body part of the player. The character 32 can be interpreted as an image for showing the player (presenting the player with) the positions of the respective body parts of the player which are being detected by the game device 20. The player can grasp that the positions of the respective body parts are being normally detected by looking at the character 32.

In this case, the character 32 displayed on the menu screen 30 and the player are put in a state of facing each other, and hence the character 32 performs a movement that is left-right reversed to the movement of the player. For example, in a case where the player raises their right hand, the displaying of the character 32 is updated so that its hand on the right side is raised in a case where viewed from the player in a real space. Note that, the outline of the player may be extracted from a photographed image to thereby display an image (player image) subjected to left-right reversing processing on the menu screen 30 in place of the character 32.

In a case where a reference time at which the player is to place the body part in a predetermined position is approaching, a reference image 34 and a guide image 36 are displayed on the game screen 30. The reference image 34 is an image for showing the player a reference position to be touched by the player. The guide image 36 is an image for showing the player the reference time.

The guide image 36 is generated from the reference image 34 after the reference image 34 is displayed, and moves away from the reference image 34 in a predetermined direction. In a case where the guide image 36 moves away from the reference image 34 by a predetermined distance, the guide image 36 turns back to move so as to approach the reference image 34. In a case where the reference time arrives, the reference image 34 and the guide image 36 coincide with each other. The player can grasp the reference time based on a positional relation between the reference image 34 and the guide image 36.

In a case where the reference time arrives, the player actually moves their hand or foot so as to cause the hand or foot indicated by the character 32 to touch the reference image 34. In the example of FIG. 7, a good evaluation is given to the player in a case where the player holds out the left hand P5 laterally so as to touch the reference image 34 placed on the left side of the character 32 in synchronization with the time at which the reference image 34 and the guide image 36 coincide with each other. In a case where the good evaluation is given to the player, a score 38 and a combo count 40 of the player increase. Note that in the following description, the phrase "the player actually moves their hand or foot so as to cause the hand or foot indicated by the character 32 to touch the reference image 34" is also paraphrased simply as "the player performs a ripple action".

In a case where the reference time arrives, the reference image 34 and the guide image 36 disappear. In a case where the next reference time is approaching, the reference image 34 for showing the reference position to be touched at the reference time and the guide image 36 for showing the reference time are displayed on the game screen 30.

In this embodiment, the game is configured so that an increase amount of the score 38 increases based on a predetermined criterion in a case where the player performs a special action. Hereinafter, the special action is referred to as "trick". In this case, a plurality of kinds of trick are prepared, and as an example thereof, description is given of a "hit trick" meaning that the player touches the reference image 34 with the body part that is hard to move to touch the reference image 34, a "rhythm trick" meaning that the player sways their body to the rhythm, and a "pose trick" meaning that the player strikes a pose.

FIG. 8 is a diagram illustrating an example of the game screen 30 displayed in a case where the hit trick is performed. As illustrated in FIG. 8, in a case where the reference image 34 is displayed on the right side of the character 32, in a case where the player uses the right hand P6, it is easy to perform the ripple action. In this case, in a case where the player makes the effort of using the left hand P5 to perform the ripple action while twisting their body, the hit trick is successful. In this state, as illustrated in FIG. 8, the player takes a posture of twisting their body, which causes the player to look as if the player were dancing.

In a case where the player succeeds in the hit trick, a trick name 42 indicating the kind of trick in which the player has succeeded is displayed, and a trick gauge 44 increases. In a case where the trick gauge 44 becomes full, a multiplying factor 46 indicating the increase amount of the score 38 increases, and the trick gauge 44 returns to zero again. As a numerical value indicated by the multiplying factor 46 increases, the increase amount of the score 38 obtained in a case where the player performs the ripple action increases. Note that the multiplying factor 46 may return to zero in a case where the player fails in the ripple action (in a case where the combos are discontinued).

FIG. 9 is a diagram illustrating an example of the game screen 30 displayed in a case where the rhythm trick is being performed. As illustrated in FIG. 9, in a case where the player swings their slightly-lowered hips up and down to the rhythm of the music track, the rhythm trick is successful. In this case, the displaying of the trick name 42 is updated so as to indicate that the rhythm trick is being performed.

For example, the trick gauge 44 gradually increases based on a time during which the rhythm trick is being performed. In this state, the player performs the ripple action by swinging their hips up and down to the rhythm, which causes the player to look as if the player is dancing with their arms/legs stretched while swinging their body to the rhythm.

FIG. 10 is a diagram illustrating an example of the game screen 30 displayed in a case where the pose trick is performed. As illustrated in FIG. 10, for example, after moving their hand or foot quickly, in a case where the player strikes a given pose with their hand or foot stopped for a fixed period, the pose trick is successful. In this case, the displaying of the trick name 42 is updated so as to indicate that the rhythm trick is being performed.

For example, in a case where the player succeeds in the pose trick, the trick gauge 44 increases by a predetermined value. In a case where the player succeeds in the pose trick, the player looks as if the player is dancing in such a manner that the player strikes a pose after a sharp movement to move their hand or foot quickly.

As described above, the game device 20 according to this embodiment is configured to allow the player to freely dance because the multiplying factor of the score increases in a case where the player performs each kind of trick compared to a case of simply evaluating the ripple action, and in addition, to be able to accurately evaluate the dance. Hereinafter, this technology is described in detail.

First, detailed description is given of hardware configurations of the position detecting device 1 and the game device 20.

(4. Configuration of Position Detecting Device)

Figure 11:
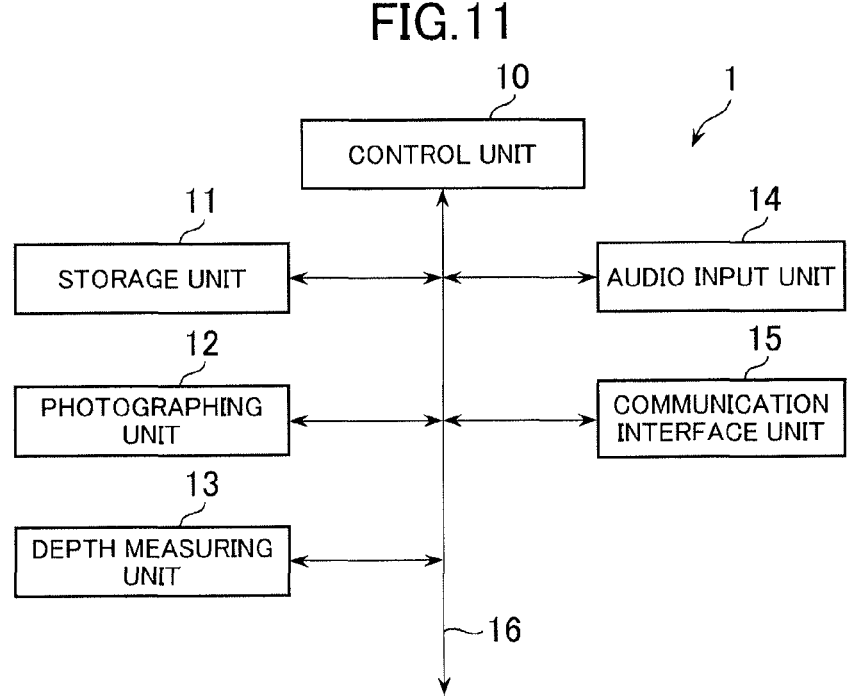
FIG. 11 is a diagram illustrating a hardware configuration of the position detecting device.

FIG. 11 is a diagram illustrating a hardware configuration of the position detecting device 1. As illustrated in FIG. 11, the position detecting device 1 includes a control unit 10, a storage unit 11, a photographing unit 12, a depth measuring unit 13, an audio input unit 14, and a communication interface unit 15. The respective components of the position detecting device 1 are connected to one another by a bus 16 so as to be able to exchange data thereamong.

The control unit 10 controls the respective units of the position detecting device 1 based on an operating system and various kinds of programs which are stored in the storage unit 11.

The storage unit 11 stores programs and various kinds of parameters which are used for operating the operating system, the photographing unit 12, and the depth measuring unit 13. Further, the storage unit 11 stores a program for generating the player body part information based on the photographed image and the depth image.

The photographing unit 12 includes the CCD camera 2 and the like. The photographing unit 12 generates, for example, the photographed image of the player. The depth measuring unit 13 includes the infrared sensor 3 and the like. The depth measuring unit 13 generates the depth image based, for example, on the TOF acquired by the infrared sensor 3. As described above, the control unit 10 generates the player body part information based on the photographed image generated by the photographing unit 12 and the depth image generated by the depth measuring unit 13 at predetermined time intervals (for example, every $\frac{1}{60}$th of a second).

The audio input unit 14 includes, for example, the microphone 4. The communication interface unit 15 is an interface for transmitting various kinds of data, such as the player body part information, to the game device 20.

(5. Configuration of Game Device)

Figure 12:
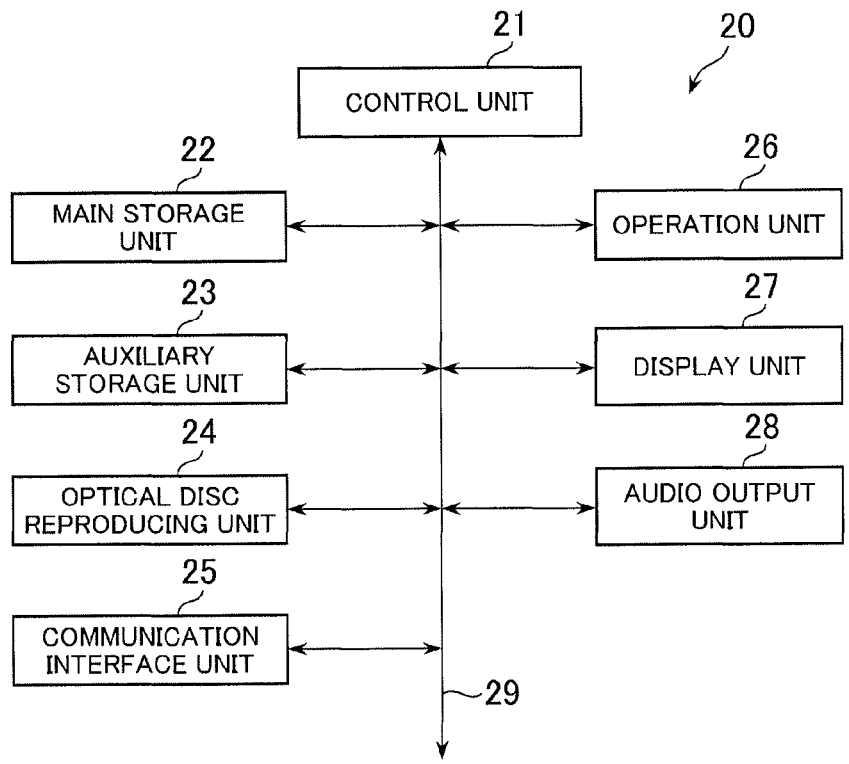
FIG. 12 is a diagram illustrating a hardware configuration of a game device.

FIG. 12 is a diagram illustrating a hardware configuration of the game device 20. As illustrated in FIG. 12, the game device 20 includes a control unit 21, a main storage unit 22, an auxiliary storage unit 23, an optical disc reproducing unit 24, a communication interface unit 25, an operation unit 26, a display unit 27, and an audio output unit 28. The respective components of the game device 20 are connected to one another by a bus 29.

The control unit 21 includes, for example, a CPU, a graphics processing unit (GPU), and a sound processing unit (SPU). The control unit 21 executes various kinds of processing in accordance with an operating system and other programs. Further, the control unit 21 includes a real time clock and functions as means for measuring time.

The main storage unit 22 includes, for example, a random access memory (RAM). The auxiliary storage unit 23 includes, for example, a hard disk drive (non-transitory information storage medium). The main storage unit 22 stores programs and data read from the auxiliary storage unit 23 or an optical disc (non-transitory information storage medium). Further, the main storage unit 22 is also used as a work memory for storing data to be required in the course of the processing. Further, for example, the main storage unit 22 chronologically stores the player body part information received from the position detecting device 1.

The optical disc reproducing unit 24 reads programs and data stored on the optical disc. For example, a game program is stored on the optical disc.

The communication interface unit 25 is an interface for communicatively connecting the game device 20 to a communication network. The game device 20 acquires the player body part information from the position detecting device 1 via the communication interface unit 25.

The operation unit 26 is used by the player to perform various kinds of operations. The operation unit 26 includes, for example, a game controller, a touch panel, a mouse, or a keyboard. The display unit 27 is, for example, a consumer television set or a liquid crystal display panel. The display unit 27 displays a screen in accordance with an instruction from the control unit 21. The audio output unit 28 includes, for example, a speaker or headphones.

In this embodiment, description is given of a case where the various kinds of programs and data are supplied to the game device 20 via the optical disc. Note that, those programs and data may be supplied to the game device 20 via another non-transitory information storage medium (for example, memory card). Alternatively, the programs and data may be supplied from a remote site to the game device 20 via the communication network.

(6. Functions Implemented on Game Device)

Figure 13:
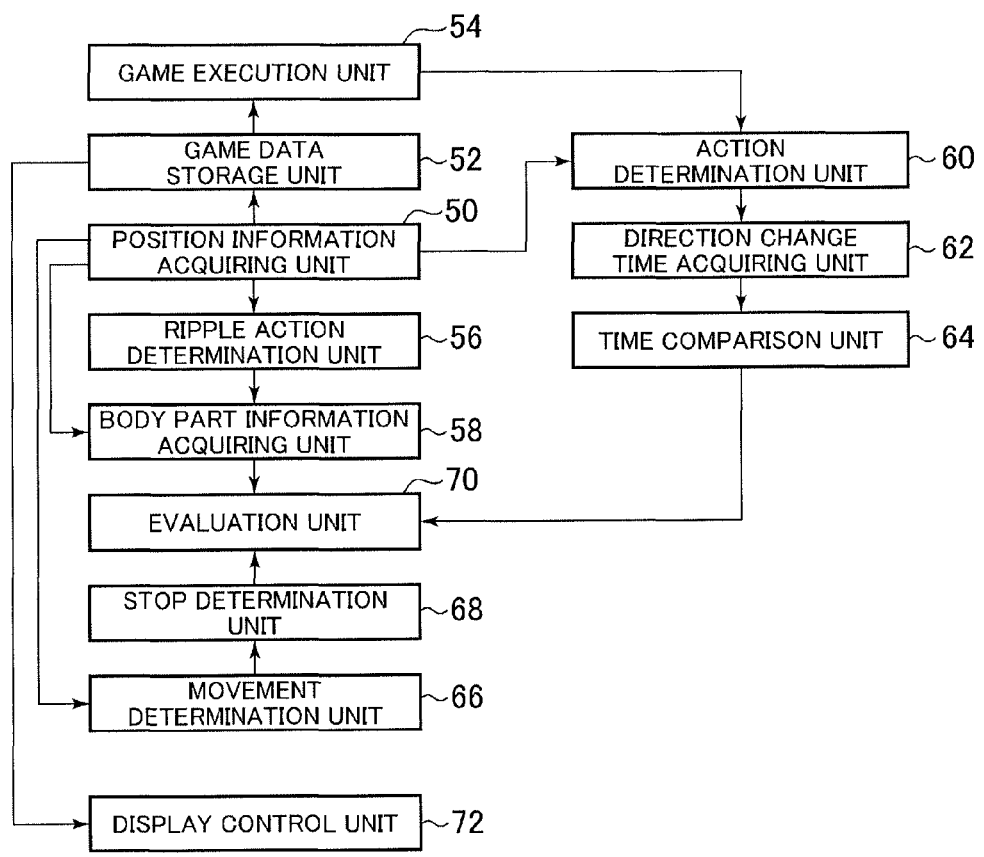
FIG. 13 is a functional block diagram illustrating functions implemented on the game device.

FIG. 13 is a functional block diagram illustrating functions implemented on the game device 20. As illustrated in FIG. 13, on the game device 20, there are implemented a position information acquiring unit 50, a game data storage unit 52, a game execution unit 54, a ripple action determination unit 56, a body part information acquiring unit 58, an action determination unit 60, a direction change time acquiring unit 62, a time comparison unit 64, a movement determination unit 66, a stop determination unit 68, an evaluation unit 70, and a display control unit 72. Those functions are implemented by the control unit 21 operating in accordance with programs read from the optical disc.

(6-1. Position Information Acquiring Unit)

The position information acquiring unit 50 is implemented mainly by the control unit 21. The position information acquiring unit 50 acquires position information relating to the position of one or a plurality of body parts of the player. In this embodiment, player body part information corresponds to the above-mentioned "position information". The player body part information indicates the position within the real space of the one or the plurality of body parts of the player, and includes information relating to the positions of, in this case, at least one hand (right hand and/or left hand) and at least one foot (left hand and/or left foot) of the player.

The position information acquiring unit 50 acquires the player body part information based on the photographed image obtained from photographing means for photographing the player existing in the real space. For example, the position information acquiring unit acquires the player body part information from position information generation means for generating the player body part information based on the photographed image obtained from the photographing means for photographing the player and depth information relating to an interval between the measurement reference position of depth measuring means and the player. In a case where the position information acquiring unit 50 acquires the player body part information, the player body part information is chronologically stored in history data (described later).

(6-2. Game Data Storage Unit)

The game data storage unit 52 is implemented mainly by the main storage unit 22, the auxiliary storage unit 23, and the optical disc. The game data storage unit 52 stores various kinds of information necessary to execute the game. In this case, the game data storage unit 52 stores the following items of data: (1) music track data; (2) reference data (3); history data obtained by chronologically storing the player body part information; and (4) game situation data indicating a situation of the game being executed.

Note that the music track data and the reference data may be data prepared by a game creator in advance or may be data created by the player. The history data has contents updated each time the player body part information is acquired by the position detecting device 1. The game situation data is data generated and updated in a case where the game is started.

The music track data is data obtained by saving general popular music or the like in a predetermined data format. In this embodiment, the music track data includes information relating to a tempo of the music track and information relating to a time at which the beat of the music track is made. The information relating to the tempo of the music track is information indicating a speed of the music track, and stores a speed (beats per minute; BPM) at which beats are made. The information relating to the time at which the beat of the music track is made is information indicating a beat time of the music track, and stores information relating to the time elapsed from a start time point of the music track until a time point at which each beat is made.

Figure 14:
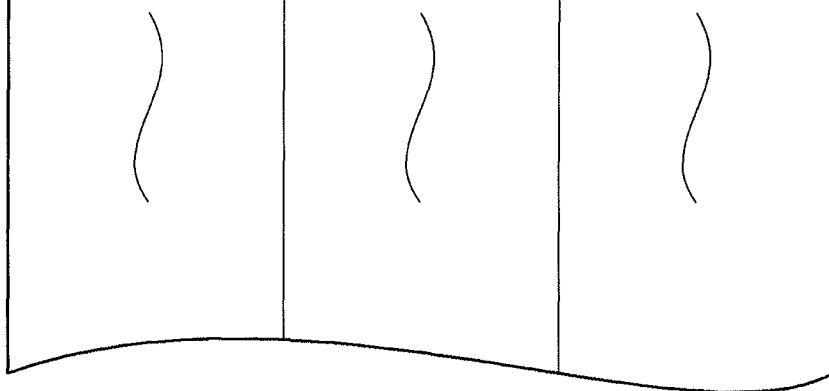
FIG. 14 is a diagram illustrating an example of reference data.

FIG. 14 is a diagram illustrating an example of the reference data. As illustrated in FIG. 14, the reference data is data obtained by associating the reference time with the reference position. The reference time is a time at which the player is to place (move) the body part in the reference position. Stored as the reference time is information indicating a time that has elapsed since reproduction of the music track started, for example, a time at which the beat of the music track is made (time elapsed at the (m/n)th (m and n are integers) beat after the start time point of the music track).

The reference position is a position in which the body part of the player is to exist at the reference time, and in this case, three-dimensional coordinates within the real space (three-dimensional coordinate space indicated by the player body part information) are stored as the reference position.

Further, in this embodiment, as illustrated in FIG. 14, the reference time and the reference position are associated with a reference body part. The reference body part is a body part that is easy to move to touch the reference position, and is a body part defined based on the reference position. The reference data is created in consideration of, for example, the tempo of the music track (rhythm).

The game situation data stores, for example, information indicating the current score of the player, information indicating the current score multiplying factor, information indicating the current elapsed time of the music track, the current numerical value corresponding to the trick gauge 44, and information relating to the current combo count. The score of the player may have the numerical value increased or decreased as a better evaluation is given to the player. The information indicating the score multiplying factor stores the numerical value displayed as the multiplying factor 46. A minimum value and a maximum value are defined for the numerical value corresponding to a trick gauge, which assumes a value between, for example, "0" and "100".

Note that the data stored in the game data storage unit 52 is not limited to the above-mentioned example. The game data storage unit 52 may be configured to store various kinds of data used to execute the game. Alternatively, for example, various kinds of data such as the reference image 34 and the guide image 36 and data (image data and audio data) for subjecting the game screen 30 to various effects may be stored. Further, the control unit 21 functions as means for acquiring the various kinds of data stored in the game data storage unit 52.

(6-3. Game Execution Unit)

The game execution unit 54 is implemented mainly by the control unit 21. The game execution unit 54 executes a game configured so that the player moves their body part in time with the music track. In this embodiment, the game execution unit 54 executes a game configured so that the player aims to locate at least one of the plurality of body parts in a given position at a given time in time with the music track.

The game execution unit 54 updates the game situation data based on the gameplay of the player. For example, based on the progress of the game, the game execution unit 54 updates the current reproduction time of the music track and updates the combo count.

(6-4. Ripple Action Determination Unit)

The ripple action determination unit 56 is implemented mainly by the control unit 21. The ripple action determination unit 56 determines whether or not at least one of the plurality of body parts of the player is placed within a determination region including the reference position at the time point corresponding to the reference time.

The "time point corresponding to the reference time" refers to any time point (a predetermined time before or after the reference time or the reference time itself) within a predetermined period including the reference time, and in this embodiment, refers to the reference time itself. The ripple action determination unit 56 determines whether or not the positions of the respective body parts indicated by the player body part information are included in the determination region.

Figure 15:
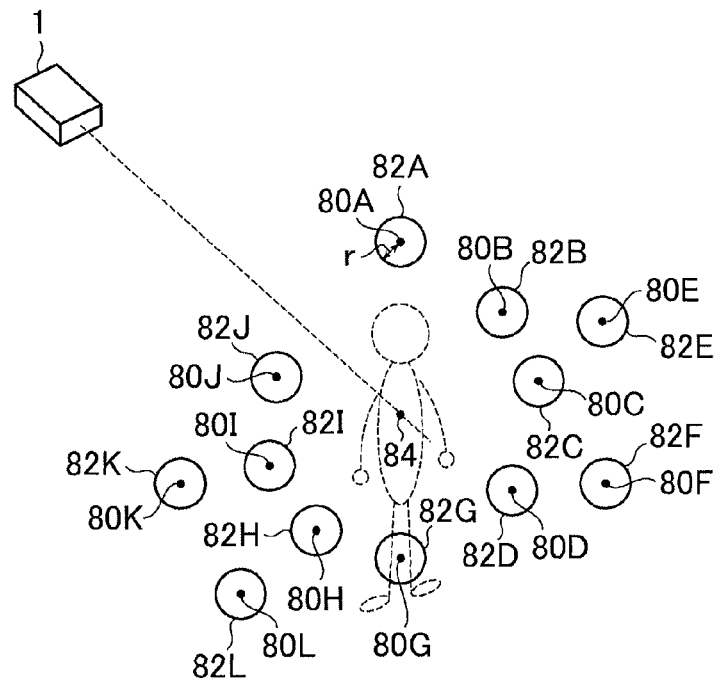
FIG. 15 is an explanatory diagram for illustrating a determination region.

FIG. 15 is an explanatory diagram for illustrating the determination region. In this case, description is given of a case where, as illustrated in FIG. 15, 12 kinds of reference positions 80A to 80L (hereinafter, collectively referred to simply as "reference position 80") are prepared, and 12 kinds of determination regions 82A to 82L (hereinafter, collectively referred to simply as "determination region 82") are set.

For example, the reference positions 80 are set around representative positions 84 (standing position of the player standing on the front side of the position detecting device 1) spaced apart from the position detecting device 1 in a direction toward a front side thereof by a predetermined distance. The reference data stores any one of the three-dimensional coordinates of those reference positions 80. As illustrated in FIG. 15, the determination region 82 is a region of a predetermined shape including the reference position 80, and in this case is a region surrounded by a sphere having a predetermined radius r with the reference position 80 as its center. A size of the determination region 82 may be set to a predefined size, or may be determined based on, for example, the situation of the game or the size of the body of the player.

The ripple action determination unit 56 compares the player body part information obtained at the time point corresponding to the reference time with the reference position 80, to thereby determine whether or not the position within the real space of the body part of the player falls within the determination region 82 including the reference position 80 set in the real space, at the reference time.

Further, the reference body part is set for each of the reference positions 80 based on the positional relation between the representative position 84 and each of the reference positions 80. For example, the reference position 80A exists above the player in a case where the player stands in the representative position 84, and hence the left hand P5 or the right hand P6 is set as the reference body part for the reference position 80A. The reference positions 80B to 80F exist on the right side of the player in a case where the player stands in the representative position 84, and hence the right hand P6 or the right foot P11 is set as the reference body part for the reference positions 80B to 80F. For example, the reference position 80G exists in a lower part of the player in a case where the player stands in the representative position 84, and hence the left foot P10 or the right foot P11 is set as the reference body part for the reference position 80G. The reference positions 80H to 80L exist on the left side of the player in a case where the player stands in the representative position 84, and hence the left hand P5 or the left foot P10 is set as the reference body part for the reference positions 80H to 80L.

(6-5. Body Part Information Acquiring Unit)

The body part information acquiring unit 58 is implemented mainly by the control unit 21. The body part information acquiring unit 58 acquires body part information relating to a kind of body part of the player which was determined to exist within the determination region 82 at the time point corresponding to the reference time. The body part information acquiring unit 58 refers to the player body part information, to thereby identify the kind of body part associated with the three-dimensional coordinates existing within the determination region 82. The body part information acquired by the body part information acquiring unit 58 is used for evaluation of the hit trick which is performed by the evaluation unit 70 as described later.

(6-6. Action Determination Unit)

The action determination unit 60 is implemented mainly by the control unit 21. The action determination unit 60 determines, based on a change in position (change in position within the real space) of the body part, whether or not the player has performed an action of changing the direction of the body part (at least one of the plurality of body parts) (hereinafter, referred to as "direction changing action"). The action determination unit 60 determines whether or not the direction changing action has been performed by identifying a moving direction of each of the body parts based on a chronological change of the player body part information and determining whether or not the moving direction of each of the body parts has changed by an angle equal to or larger than a predetermined angle (for example, 30°).

Figure 16:
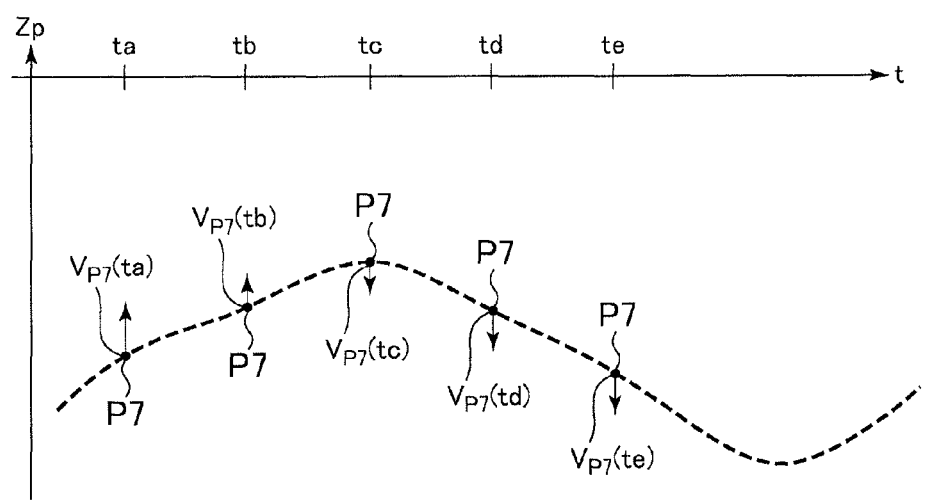
FIG. 16 is an explanatory diagram for illustrating a determination method performed by an action determination unit.

FIG. 16 is an explanatory diagram for illustrating a determination method performed by the action determination unit 60. FIG. 16 illustrates a t-axis serving as a time axis. In this case, description is given of a case of determining whether or not the direction changing action has been performed based on the change in position of the three-dimensional coordinates of the back P7 corresponding to the position of the waist of the player. As illustrated in FIG. 16, a moving direction $V_{P7}(t)$ of the back P7 is identified based on the chronological change in the three-dimensional coordinates of the back P7.

In a case where an angle $\theta_{P7}$ formed between the current moving direction $V_{P7}(t)$ and the previous moving direction $V_{P7}(t)$ is equal to or larger than the predetermined angle, it is determined that the direction changing action has been performed. In this case, description is given of a case where the player swings their entire body up and down to thereby move up and down the back P7. For example, the back P7 moves upward (as in states at times $t_a$ and $t_b$), reaches its peak (as in a state at a time $t_c$), and changes its direction to start moving downward (as in states at times $t_d$ and $t_e$). This action of turning back corresponds to the direction changing action. In the same manner, after the player has moved the back P7 downward, the back P7 changes its direction to start moving upward.

In this manner, in this embodiment, the action determination unit 60 determines whether or not reciprocation of the body part is performed by the player. The reciprocation is an action of repetitively moving a specific body part so as to reciprocate in a predetermined direction.

(6-7. Direction Change Time Acquiring Unit)

The direction change time acquiring unit 62 is implemented mainly by the control unit 21. The direction change time acquiring unit 62 acquires a direction change time of the body part during the direction changing action. The direction change time acquiring unit 62 acquires a time in a case where the moving direction of the body part of the player changes by the angle equal to or larger than the predetermined angle.

In this case, the reciprocation of the player is detected, and hence the direction change time acquiring unit 62 acquires, as the direction change time, a turning-back time at which the body part turns back during the action. The turning-back time is a time at which the moving direction of the back P7 shifts by substantially 180°. Note that the phrase "substantially 180°" means that the moving direction may not be precisely 180°, and the moving direction may shift from 180° by approximately 10° or 15° based on the movement of the player.

(6-8. Time Comparison Unit)

The time comparison unit 64 is implemented mainly by the control unit 21. The time comparison unit 64 compares the direction change time with a time defined based on the beat of the music track. The "time defined based on the beat of the music track" refers to a time defined based on the time at which the beat of the music track is made (beat time) (a predetermined time before or after the beat time or the beat time itself), for example, the beat time itself. As described above, the information indicating the time at which the beat of the music track is made may be included in, for example, the music track data.

Figure 17:
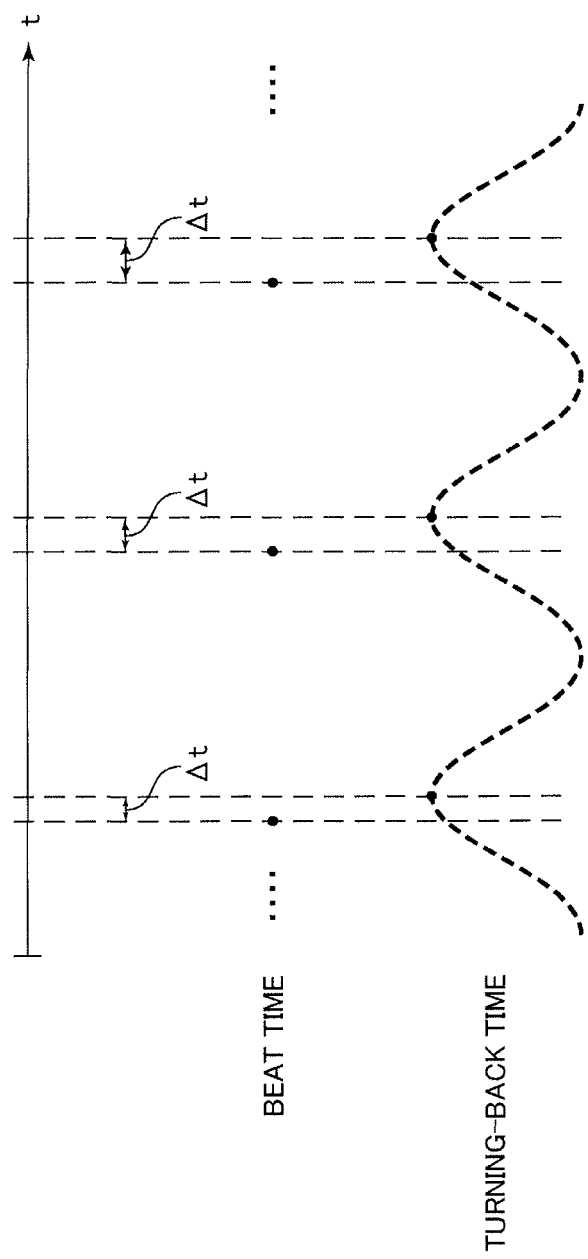
FIG. 17 is an explanatory diagram for illustrating comparison processing performed by a time comparison unit.

FIG. 17 is an explanatory diagram for illustrating comparison processing performed by the time comparison unit 64. As illustrated in FIG. 17, in this case, the time comparison unit 64 compares the turning-back time at which the back P7 turns back with the time defined based on the beat of the music track. For example, the time comparison unit 64 determines whether or not a time lag Δt between the turning-back time at which the back P7 turns back and the time defined based on the beat of the music track is equal to or smaller than a threshold value. In a case where the time lag Δt is equal to or smaller than the threshold value, it is determined that the rhythm trick is successful, and the evaluation is performed by the evaluation unit 70 as described later.

(6-9. Movement Determination Unit)

The movement determination unit 66 is implemented mainly by the control unit 21. The movement determination unit 66 determines, based on the position information (for example, positions within the real space of the plurality of body parts), whether or not at least one of the plurality of body parts (for example, at least one hand or at least one foot of the player) moved at a speed equal to or faster than a reference speed. The movement determination unit 66 identifies a moving speed of the respective body parts of the player based on the chronological change of the player body part information, and compares the moving speeds of the respective body parts and the reference speed.

The reference speed may be a predefined speed, or may be a speed set based on the situation of the game or the size of the body of the player. In this case, the movement determination unit 66 determines, based on the position information, whether or not at least one of the plurality of body parts moved at the speed equal to or faster than the reference speed between one reference time and a subsequent reference time thereto (between a first reference time and a second reference time that arrives after the first reference time).

(6-10. Stop Determination Unit)

The stop determination unit 68 is implemented mainly by the control unit 21. In a case where it is determined that at least one of the plurality of body parts (for example, at least one hand or at least one foot of the player) moved at the speed equal to or faster than the reference speed, the stop determination unit 68 determines, based on the position information (for example, position within the real space of the body part that moved at the speed equal to or faster than the reference speed), whether or not the body part (for example, hand or foot) that moved at the speed equal to or faster than the reference speed has maintained a substantially stopped state for a reference period after having moved.

In this case, the stop determination unit 68 includes means for determining whether or not the body part that moved at the speed equal to or faster than the reference speed is in the substantially stopped state by determining whether or not the body part exists within a range defined based on the position of the body part after having moved, and determines whether or not the body part has maintained its position within the range for the reference period. Further, the stop determination unit 68 determines whether or not the body part that moved at the speed equal to or faster than the reference speed maintained the substantially stopped state for the reference period after having moved between one reference time and the subsequent reference time thereto.

Figure 18:
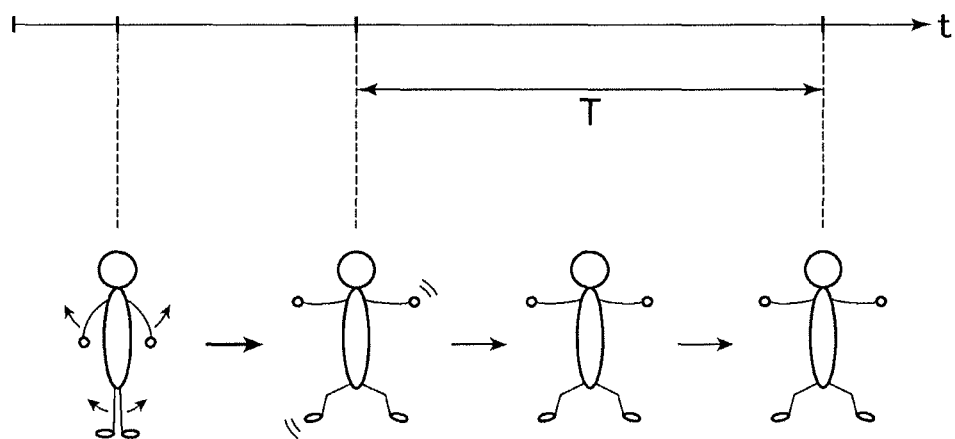
FIG. 18 is an explanatory diagram for illustrating a determination method performed by a movement determination unit and a stop determination unit.

FIG. 18 is an explanatory diagram for illustrating the determination method performed by the movement determination unit 66 and the stop determination unit 68. As illustrated in FIG. 18, the movement determination unit 66 determines whether or not the moving speed of the hand or foot has become equal to or smaller than a predetermined value in a case where the moving speed of the hand or foot of the player is determined as the speed equal to or faster than the reference speed. Then, it is determined whether or not the hand or foot has stayed within a region including the position of the hand or foot in the case where the moving speed of the hand or foot has become equal to or smaller than the predetermined value. The stop determination unit 68 determines whether or not the staying state has been maintained for a reference period T.

Note that the determination method performed by the stop determination unit 68 is not limited to the above-mentioned example. Alternatively, for example, the stop determination unit 68 may be configured to include means for determining whether or not the body part that moved at the speed equal to or faster than the reference speed is in the substantially stopped state by determining whether or not the body part has decelerated to a moving speed of substantially zero (for example, state of being equal to or smaller than a reference value) after having moved, and to determine whether or not the body part has maintained the moving speed of substantially zero for the reference period.

(6-11. Evaluation Unit)

The evaluation unit 70 is implemented mainly by the control unit 21. The evaluation unit 70 evaluates the gameplay of the player. In this case, the evaluation unit 70 evaluates the gameplay of the player by changing the score of the player based on a determination result obtained by the ripple action determination unit 56.

For example, in a case where the body part of the player is included in the determination region 82 at the reference time, the evaluation unit 70 increases the score of the player. In this embodiment, a standard increase amount of the score given in a case where the score multiplying factor indicated by the game situation data is one is defined, and the score of the player increases by a value obtained by multiplying the standard increase amount by the current score multiplying factor. Note that a method of increasing the score of the player by the evaluation unit 70 is not limited thereto, and the score may be increased by referring to a value within a table in which the increase amount of the score is prestored.

As described above, in this embodiment, based on an evaluation result of three kinds of tricks performed by the player, the evaluation unit 70 determines a change amount of the score of the player by increasing the score multiplying factor on a predetermined criterion. the evaluation unit 70 uses the determined change amount to change the score of the player, to thereby evaluate the gameplay of the player.

(Evaluation Method for the Hit Trick)

First, description is given of an evaluation method for the hit trick. The evaluation unit 70 evaluates the gameplay of the player based on the kind of body part acquired by the body part information acquiring unit 58. The evaluation unit 70 compares the kind of body part of the player which has been determined to exist within the determination region 82 with the reference body part, and evaluates the gameplay of the player based on a comparison result thereof. In this example, the evaluation unit 70 gives the player a better evaluation in a case where the kind of body part of the player which has been determined to exist within the determination region is different from the reference body part, than in a case of being the same.

Further, the evaluation unit 70 includes means for determining the change amount of the score of the player based on the kind of body part of the player which was determined to exist within the determination region 82 at the time point corresponding to the reference time. In this case, the evaluation unit 70 determines the score multiplying factor based on the kind of body part acquired by the body part information acquiring unit 58, to thereby determine the change amount of the score of the player.

That is, the evaluation unit 70 determines, based on the kind of body part acquired by the body part information acquiring unit 58, the change amount of the score given in the case where the body part information acquiring unit 58 acquires the kind of body part, or in the case where the score of the player is changed based on the determination result obtained by the ripple action determination unit 56 based on the score of the player after the above-mentioned case. For example, the kind of body part and the change amount of the score may be stored in association with each other in the game data storage unit 52. In this case, the score is changed based on the change amount associated with the kind of body part acquired by the body part information acquiring unit 58.

(Evaluation Method for the Rhythm Trick)

Next, description is given of an evaluation method for the rhythm trick. The evaluation unit 70 evaluates the gameplay of the player based on a comparison result obtained by the time comparison unit 64. In this example, a better evaluation is given to the player in a case where the time lag Δt between the turning-back time and the beat time is equal to or smaller than the threshold value than in a case of being larger than the threshold value.

In this embodiment, the player performs the ripple action while performing the rhythm trick, and hence the evaluation unit 70 evaluates the gameplay of the player based on a comparison result obtained by the ripple action determination unit 56 and the comparison result obtained by the time comparison unit 64. For example, the evaluation unit 70 includes means for determining the change amount of the score of the player based on a determination result obtained by the time comparison unit 64. The evaluation unit 70 determines the change amount of the score of the player by determining the score multiplying factor based on the comparison result obtained by the time comparison unit 64.

That is, the evaluation unit 70 determines, based on the comparison result obtained by the time comparison unit 64, the change amount of the score given in the case where the comparison is performed by the time comparison unit 64 or in the case where the score of the player is changed based on the comparison result obtained by the ripple action determination unit 56 after the above-mentioned case. For example, a criterion relating to the time lag Δt and the change amount of the score may be stored in association with each other in the game data storage unit 52. In this case, the score is changed based on the change amount associated with the criterion satisfied by the time lag Δt.

(Evaluation Method for the Pose Trick)

Next, description is given of an evaluation method for the pose trick. The evaluation unit 70 evaluates the gameplay of the player based on a determination result obtained by the stop determination unit 68. The evaluation unit 70 gives the player a better evaluation in a case where the body part has maintained the substantially stopped state for the reference period than in a case where the body part has failed to maintain the substantially stopped state for the reference period.

In this embodiment, the player sometimes performs the ripple action while performing the pose trick, and hence the evaluation unit 70 evaluates the gameplay of the player based on the comparison result obtained by the ripple action determination unit 56 and the determination result obtained by the stop determination unit 68. For example, the evaluation unit 70 includes means for determining the change amount of the score of the player based on the determination result obtained by the stop determination unit 68. The evaluation unit 70 determines the change amount of the score of the player by determining the score multiplying factor based on the determination result obtained by the stop determination unit 68.

For example, the movement determination unit 66 performs determination between the first reference time and the second reference time, being the reference time that arrives subsequently to the first reference time, and the stop determination unit 68 performs determination between the first reference time and the second reference time. Therefore, the evaluation unit 70 determines, based on the determination result obtained by the stop determination unit 68, the change amount of the score given in the case of changing the score of the player based on the second reference time or the comparison result obtained by the ripple action determination unit 56 relating to the reference time that arrives after the second reference time.

Note that in this case, description is given of a mode in which a better evaluation is given in the case where the player succeeds in the trick than in a normal case, but it is also possible to have a mode in which a normal evaluation is given in the case where the player succeeds in the trick and a lower evaluation is given in the case where the player did not perform the trick. That is, a relatively good evaluation may be given in the case where the player succeeds in the trick than in the normal case.

(6-12. Display Control Unit)

The display control unit 72 is implemented mainly by the control unit 21. The display control unit 72 executes various kinds of display control processing relating to the game screen 30. For example, the display control unit 72 causes the character 32 to perform an action within the game screen 30 based on the chronological change of the player body part information.

(7. Processing Executed on the Game Device)

Figure 19:
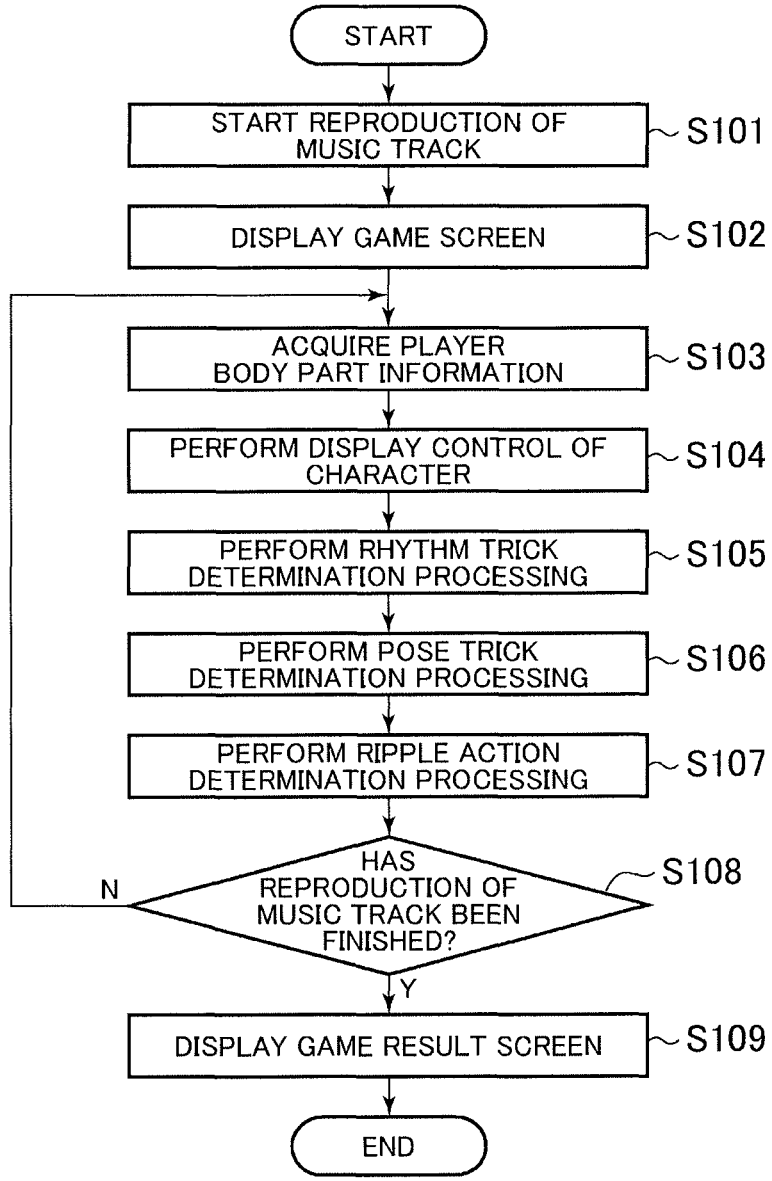
FIG. 19 is a flowchart illustrating an example of processing executed on the game device.

FIG. 19 is a flowchart illustrating an example of processing executed on the game device 20. The processing of FIG. 19 is executed by the control unit 21 performing based on the program read from the optical disc in a case where an instruction to start the game is issued.

As illustrated in FIG. 19, first, the control unit 21 starts reproduction of the music track (S101). The control unit 21 displays the game screen 30 on the display unit 27 (S102). Note that in a case where the game is started, the game situation data is generated in the main storage unit 22, and an initial value is stored therein. For example, the numerical values of the score of the player, the combo count, and the trick gauge become "0", and the score multiplying factor becomes "1". The score 38, the combo count 40, the trick gauge 44, and the multiplying factor 46 are displayed on the game screen 30 based on those initial values, and the displaying thereof is appropriately updated in a case where the game situation data is updated by processing described later.

The control unit 21 acquires the player body part information from the position detecting device 1, and causes the main storage unit 22 to store the player body part information (S103). The control unit 21 performs display control of the character 32 based on the most recent player body part information (S104). In Step S104, the display control is performed so that the character 32 performs the action corresponding to the action of the player. For example, with skeletal information set for the character 32 in advance, the position of the skeleton of the character 32 indicated by the skeletal information is changed based on the player body part information, and the character 32 thereby performs the action corresponding to the player.

The control unit 21 executes determination processing for the rhythm trick (S105).

Figure 20:
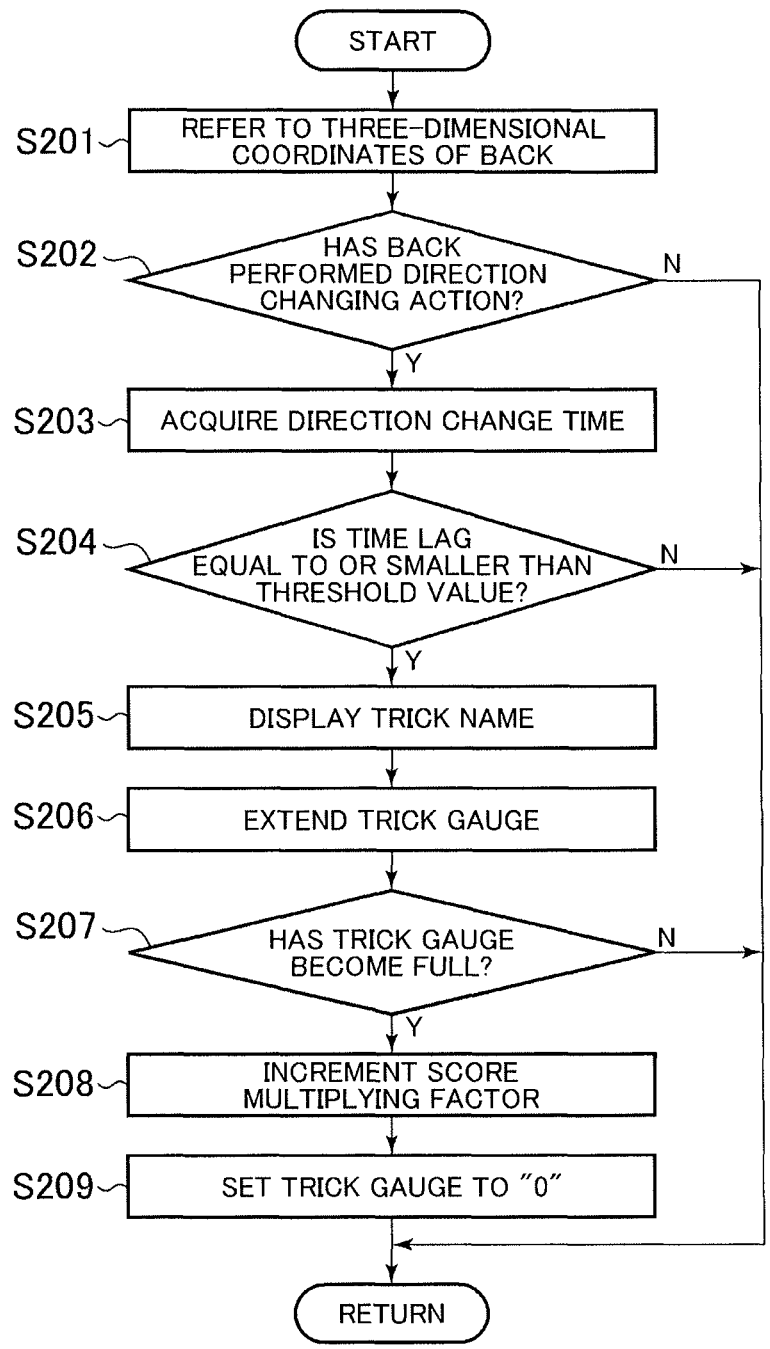
FIG. 20 is a flowchart illustrating determination processing for the rhythm trick.

FIG. 20 is a flowchart illustrating the determination processing for the rhythm trick. As illustrated in FIG. 20, the control unit 21 refers to the three-dimensional coordinates of the back P7 (S201). The control unit 21 determines whether or not the back P7 has performed the direction changing action based on the chronological change in the three-dimensional coordinates of the back P7 (S202). In Step S202, it is determined whether or not the back P7 has changed its direction by acquiring the moving direction $V_{P7}$ of the back P7 based on the chronological change in position of the back P7 and determining whether or not the change of the moving direction $V_{P7}$ is equal to or larger than the predetermined angle.

In a case where it is determined that the back P7 has changed its direction (S202; Y), the control unit 21 acquires a current time point as the direction change time (S203). The control unit 21 refers to the music track data to determine whether or not the time lag Δt between the direction change time acquired in Step S203 and the beat time of the music track is equal to or smaller than the threshold value (S204).

In a case where it is determined that the time lag Δt is equal to or smaller than the threshold value (S204; Y), the control unit 21 displays the trick name 42 indicating the rhythm trick on the game screen 30 (S205). The control unit 21 increases the numerical value indicated by the trick gauge 44 by a predetermined value, and extends the trick gauge 44 (S206). The change amount of the trick gauge 44 applied in the case where the rhythm trick is successful may be a predefined value, or may be changed based on respective factors such as the situation of the game and a difficulty set for the music track.

The control unit 21 determines whether or not the trick gauge 44 has become full (S207). In Step S207, it is determined whether or not the numerical value of the trick gauge 44 stored in the game situation data has become the maximum value. Alternatively, it is determined whether or not the trick gauge 44 has extended to an end portion.

In a case where it is determined that the trick gauge 44 has become full (S207; Y), the control unit 21 increments the score multiplying factor stored in the game situation data, and updates the displaying of the multiplying factor 46 (S208). Subsequently, the control unit 21 returns the trick gauge 44 to "0", and updates the displaying of the trick gauge 44 (S209).

On the other hand, in a case where it is not determined that the back P7 has changed its direction (S202; N), the processing of Steps S203 to S209 is not executed. In this case, the back P7 is moving in the same direction as immediately before, and hence it is not determined that the rhythm trick is successful.

Further, in a case where it is not determined that the time lag is equal to or smaller than the threshold value (S204; N), the processing of Steps S205 to S209 is not executed. In this case, the time at which the back P7 is swung up and down deviates significantly from the beat time, which means that the player cannot move in rhythm to the music track, and hence it is not determined that the rhythm trick is successful.

Further, in a case where it is not determined that the trick gauge 44 becomes full (S207; N), the processing of Steps S208 and S209 is not executed. In this case, the rhythm trick is successful, but the numerical value of the trick gauge 44 has not become the maximum value, and hence the score multiplying factor is not changed.

In a case where the determination processing for the rhythm trick is finished, the procedure returns to the flow of FIG. 19, and the control unit 21 executes determination processing for the pose trick (S106).

Figure 21:
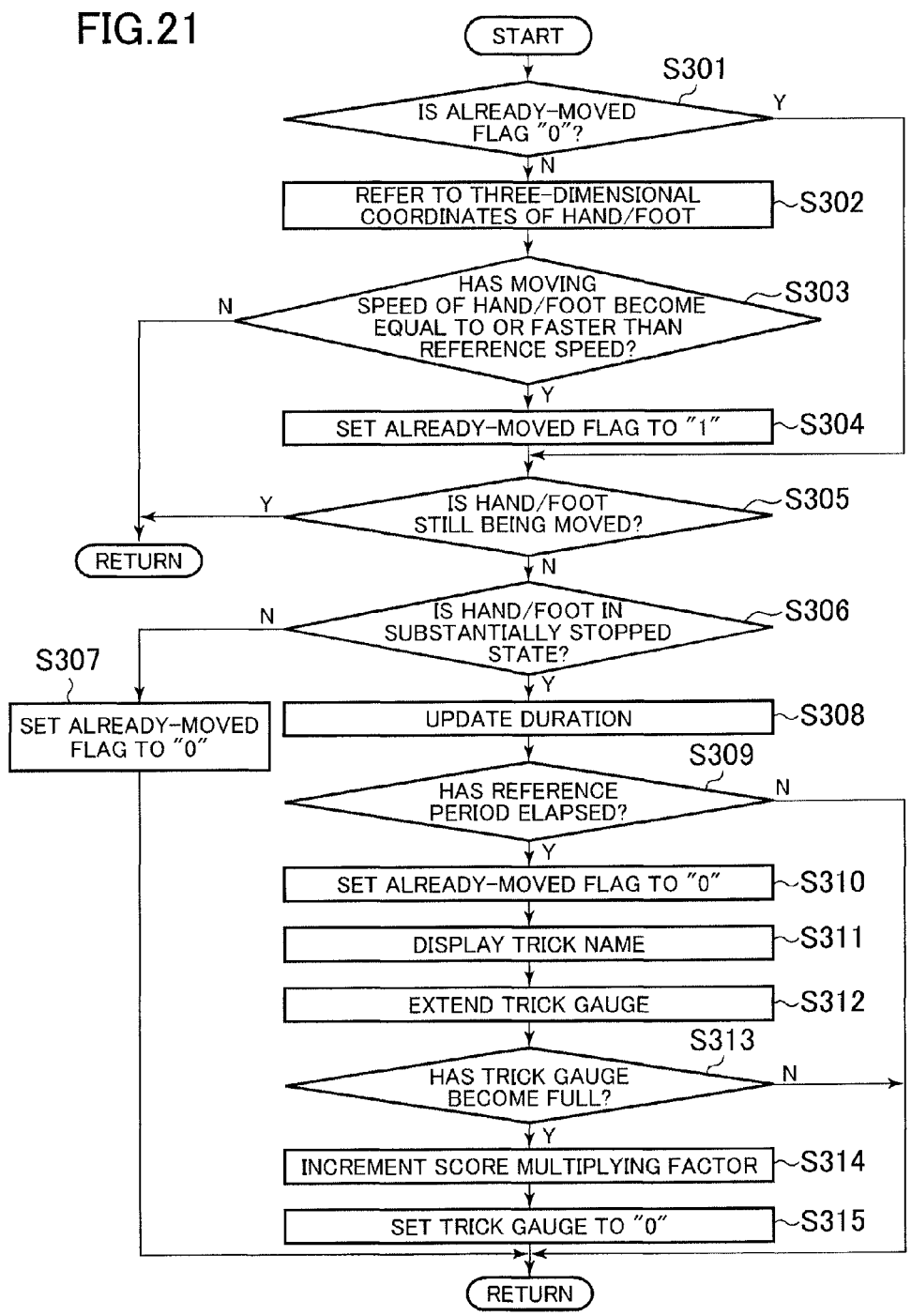
FIG. 21 is a flowchart illustrating determination processing for the pose trick.

FIG. 21 is a flowchart illustrating the determination processing for the pose trick. As illustrated in FIG. 21, the control unit 21 determines whether or not the already-moved flag is "0" (S301). The already-moved flag is a flag indicating whether or not the player has moved their hand or foot at the speed equal to or faster than the reference speed. The already-moved flag being "0" indicates that the player has not moved their hand or foot at the speed equal to or faster than the reference speed, and the already-moved flag being "1" indicates that the player has already moved their hand or foot at the speed equal to or faster than the reference speed.

In a case where it is determined that the already-moved flag is "0" (S301; Y), the control unit 21 refers to the three-dimensional coordinates of the hand or foot (for example, left hand P5, right hand P6, left foot P10, or right foot P11) of the player indicated by the player body part information (S302).

The control unit 21 determines whether or not the moving speed of the hand or foot of the player has become the speed equal to or faster than the reference speed (S303). In Step S303, the moving speed of the hand or foot is identified based on the chronological change of the three-dimensional coordinates of the hand or foot of the player, and the moving speed is compared with the reference speed.

In a case where it is determined that the moving speed of the hand or foot of the player has become the speed equal to or faster than the reference speed (S303; Y), the control unit 21 sets the already-moved flag to "1" (S304).

On the other hand, in a case where it is determined that the already-moved flag is "1" (S301; Y), the hand or foot of the player is being moved at the speed equal to or faster than the reference speed, hence the processing of Steps S302 to S304 is not performed, and the processing advances to Step S305.

The control unit 21 determines whether or not the hand or foot of the player is still being moved (S305). In Step S305, it may be determined whether or not a current moving speed of the hand or foot of the player is equal to or smaller than the predetermined value, or it may be determined whether or not the predetermined time has elapsed since the already-moved flag was set to "1".

In a case where it is determined that the current hand or foot of the player is still being moved (S305; Y), the processing advances to Step S107.

In a case where it is not determined that the hand or foot of the player is still being moved (S305; N), the control unit 21 determines whether or not the hand or foot that moved at the speed equal to or faster than the reference speed is in the substantially stopped state (S306). In Step S306, for example, it is determined whether or not the hand or foot of the player is in the substantially stopped state by determining whether or not the current hand or foot of the player is placed within a region including the position of the hand or foot at the time point at which the determination is performed in Step S305.

In a case where it is not determined that the hand or foot of the player is in the substantially stopped state (S306; N), the control unit 21 sets the already-moved flag to "0" (S307), and the processing advances to Step S107. In this case, the player does not fix their hand or foot, and hence it is not determined that the pose trick is successful.

In a case where it is determined that the hand or foot of the player is in the substantially stopped state (S306; Y), the control unit 21 measures time to update a duration (S308). Information indicating the duration is stored in, for example, the game situation data. In a case where the time is measured in Step S308, the numerical value indicating the duration increases in accordance with the time measurement.

The control unit 21 determines whether or not the reference period has elapsed (S309). In Step S309, the determination is performed by comparing the duration updated in Step S308 with the reference period.

In a case where it is determined that the reference period has elapsed (S309; Y), the control unit 21 sets the already-moved flag to "0" (S310). The subsequent Steps S311 to S315 are the same as Steps S205 to S209, respectively. That is, the processing for displaying the trick name 42 indicating that the pose trick is successful, increasing the numerical value indicated by the trick gauge 44 by the predetermined value, and in a case where the numerical value is the maximum value, incrementing the score multiplying factor while returning the numerical value to "0", is executed.

Referring to FIG. 19 again, the control unit 21 executes determination processing for the ripple action (S107).

Figure 22:
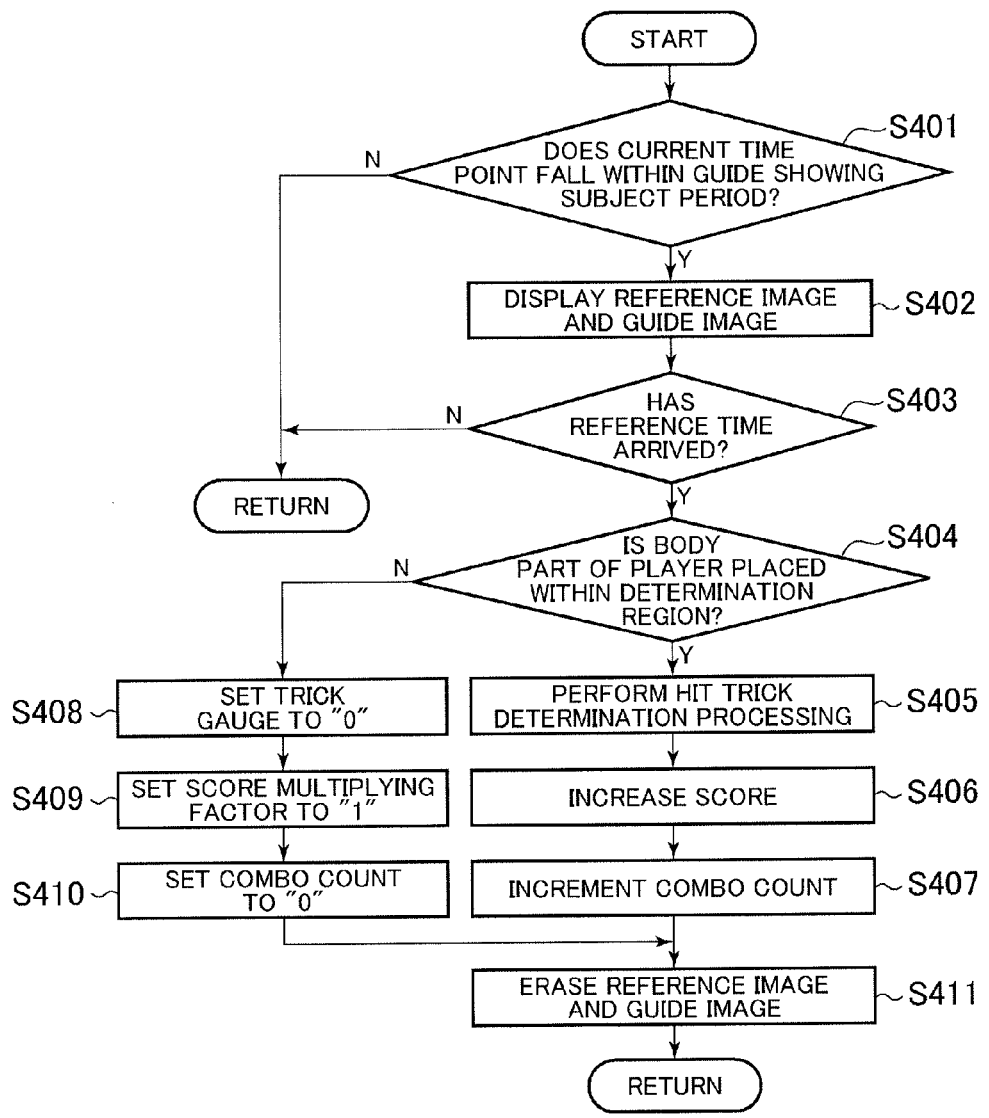
FIG. 22 is a flowchart illustrating determination processing for a ripple action.

FIG. 22 is a flowchart illustrating the determination processing for the ripple action. As illustrated in FIG. 22, the control unit 21 determines whether or not the current time point falls within the guide showing subject period (S401). The guide showing subject period represents a period during which the reference time is to be shown to the player and which corresponds to the reference time. The guide showing subject period is, for example, a predetermined period including the reference time (period from a first time before the reference time until a second time thereafter) or a period from a predetermined time before the reference time until the reference time.

In a case where it is not determined that the current time point falls within the guide showing subject period (S401; N), the processing advances to Step S108. In this case, the reference time is not approaching, and hence the determination processing for the ripple action or the display control processing for the reference image 34 and the guide image 36 is not executed.

On the other hand, in a case where it is determined that the current time point falls within the guide showing subject period (S401; N), the control unit 21 performs the display control processing for the guide image 36 and the reference image 34 for showing the reference time corresponding to the guide showing subject period and the reference position (S402). In Step S402, for example, a display position of the guide image 36 is determined so that a distance between the reference image 34 and the guide image 36 corresponds to a time difference between the current time point and the reference time.

The control unit 21 determines whether or not the reference time has arrived (S403). In a case where it is not determined that the reference time has arrived (S403; N), the processing advances to Step S108. In this case, the current time point precedes the reference time, and hence the determination processing for the ripple action is not performed.

On the other hand, in a case where it is determined that the reference time has arrived (S403; Y), the control unit 21 determines whether or not the body part of the player is placed within the determination region 82 including the reference position 80 associated with the reference time (S404). In Step S404, it is determined whether or not the three-dimensional coordinates of each of the body parts indicated by the most recent player body part information are within the determination region 82.

In a case where it is determined that the body part of the player is placed within the determination region 82 (S404; Y), the control unit 21 executes determination processing for the hit trick (S405).

Figure 23:
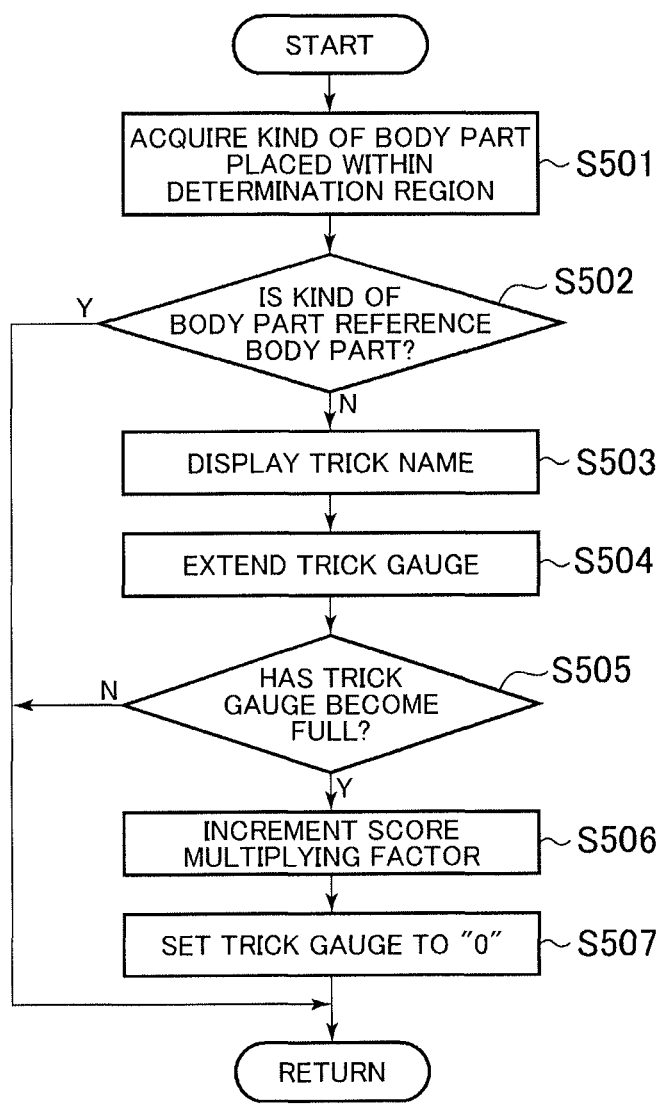
FIG. 23 is a flowchart illustrating determination processing for the hit trick.

FIG. 23 is a flowchart illustrating the determination processing for the hit trick. As illustrated in FIG. 23, the control unit 21 acquires the kind of body part placed within the determination region 82 (S501). In Step S501, the kind of body part associated with the three-dimensional coordinates within the determination region 82 is acquired by referring to the player body part information.

The control unit 21 determines whether or not the kind of body part acquired in Step S501 is the reference body part (S502). In Step S501, it is determined whether or not the reference body part associated with the reference time and the reference position coincides with the kind of body part acquired in Step S501.

In a case where it is determined that the body part placed within the determination region 82 is the reference body part (S502; Y), the processing advances to Step S406. In this case, the player has touched by using the body part that is easy to move to touch the reference position 80, which means that the hit trick is not successful, and hence the trick gauge 44 is not changed.

On the other hand, in a case where it is not determined that the body part placed within the determination region 82 is the reference body part (S502; N), the processing advances to Step S503. Steps S503 to S507 are the same as Steps S205 to S209, respectively. That is, the processing for displaying the trick name 42 indicating that the hit trick is successful, increasing the numerical value indicated by the trick gauge 44 by the predetermined value, and in a case where the numerical value is the maximum value, incrementing the score multiplying factor while returning the numerical value to "0", is executed.

Referring to FIG. 22 again, the control unit 21 increases the score of the player based on the current score multiplying factor (S406), and increments the combo count (S407). In Step S406, the score of the player is increased by the numerical value obtained by multiplying the standard increase amount by the current score multiplying factor.

On the other hand, in a case where it is not determined that the body part of the player is placed within the determination region 82 (S404; N), the control unit 21 sets the trick gauge 44 to "0" (S408). The control unit 21 returns the score multiplying factor to "1" (S409), and sets the combo count to "0" (S410). The control unit 21 erases the reference image 34 and the guide image 36 from the game screen 30 (S411).

Referring to FIG. 19 again, the control unit 21 determines whether or not the reproduction of the music track has been finished (S108). In a case where it is not determined that the reproduction of the music track has been finished (S108; N), the processing returns to Step S103. In this case, the most recent player body part information is acquired again, and the determination processing for each kind of trick and the determination processing for the ripple action are performed.

In a case where it is determined that the reproduction of the music track has been finished (S108; Y), the control unit 21 displays a game result screen that shows game results on the game screen 30 (S109), and the processing is brought to an end.

According to the game device 20 described above, in a case where the player succeeds in each kind of trick, it is possible to increase the multiplying factor of a score increase amount applied in the case where the ripple action is successful. For example, in a case where the player succeeds in the hit trick, it is possible to more accurately evaluate the gameplay of the player who has made the effort to use their body part that is hard to perform the ripple action than a game configured so that the player simply aims to place the body part in a predetermined position at a predetermined time, and to give a feeling of satisfaction to the player.

Further, by performing the determination processing for the rhythm trick, the game device 20 can evaluate how the player is playing the game in rhythm to the music track.

Further, by performing the determination processing for the pose trick, the game device 20 can evaluate how the player struck a given pose after having moved their body part quickly.

Further, by changing the change amount of the score in a case where the player succeeds in each kind of trick, it is possible to encourage the player to perform each kind of trick, which can enhance the feeling of satisfaction given in the case where the player succeeds in each kind of trick.

Further, the pose trick is determined only based on the change in position of the hand or foot of the player, to thereby enable the pose trick to be determined by simpler processing than determination using all body parts.

(7. Modified Examples)

The present invention is not limited to the embodiment described above and modified examples to be described below, and changes can be made appropriately within a range that does not depart from the gist of the present invention.

(7-1. Modified Example Relating to the Hit Trick)

(1-1) For example, in the embodiment, the description is directed to the case where the ripple action is successful in a case where at least one of the body parts of the player is placed within the determination region 82, but the ripple action may be successful in a case where the player locates a plurality of body parts within the determination region 82. In this case, the gameplay of the player may be evaluated based on a combination of the body parts located within the determination region 82.

The ripple action determination unit 56 according to this modified example determines whether or not at least two of the plurality of body parts of the player are placed within the determination region 82 at the time point corresponding to the reference time. The ripple action determination unit 56 determines whether or not at least two sets of the three-dimensional coordinates indicated by the player body part information are included in the determination region 82.

Further, the body part information acquiring unit 58 according to this modified example acquires the body part information relating to the combination of the kinds of body part which have been determined to exist within the determination region 82. The body part information acquiring unit 58 acquires the combination of the kinds of body part of the player which have been determined to exist within the determination region 82, by acquiring the kinds of body part associated with the three-dimensional coordinates included in the determination region 82.

Further, the evaluation unit 70 according to this modified example evaluates the gameplay of the player based on the combination of the kinds of body part acquired by the body part information acquiring unit 58. The evaluation unit 70 evaluates the gameplay of the player by determining whether or not the combination of the kinds of body part acquired by the body part information acquiring unit 58 is a given combination.

For example, the game data storage unit 52 may be configured to store data obtained by associating the criterion relating to the combination of the body parts with an evaluation content for the player (for example, increase amount of the trick gauge 44). In this case, the evaluation content associated with the criterion satisfied by the combination of the kinds of body part acquired by the body part information acquiring unit 58 is given to the player.

Further, for example, the combination of a plurality of reference body parts may be stored in the reference data in advance. In this case, the evaluation unit 70 evaluates the gameplay of the player by determining whether or not the combination of the body parts acquired by the body part information acquiring unit 58 coincides with the combination of the plurality of reference body parts. For example, the evaluation unit 70 gives a better evaluation or a lower evaluation to the player in a case where the combination of the body parts acquired by the body part information acquiring unit 58 coincides with the combination of the plurality of reference body parts than in a case where there is no coincidence.

According to this modified example, the evaluation for the player is changed based on the combination of the body parts used by the player to perform the ripple action, and hence it is also possible to evaluate the action (dance) of the player exhibiting a high difficulty level compared to the case where only one body part is used for the evaluation.

(1-2) Further, for example, in the embodiment, the description is directed to the case where the hit trick is successful in a case where the body part different from the reference body part is used to touch the reference position, but, for example, the case where the reference body part associated with a given reference position is the right hand means that the reference position is easy to touch by using the right hand, and hence it may be determined that the hit trick is successful in a case where the left hand or the left foot that is relatively hard to move to touch the reference position is used to perform the ripple action.

In this modified example, the reference data is associated with the body part included in an upper limb (which corresponds to body parts from the shoulder to the tip end, indicating an entire arm) or a lower limb (which corresponds to body parts from the waist to the tip end, indicating an entire leg) on one side of the player corresponding to the reference position. The upper limb or the lower limb on the one side of the player corresponding to the reference position represents the upper limb or the lower limb that is easy to move to touch the reference position, and is predefined based on the positional relation between the reference position and the representative position 84 within the real space (for example, point defined based on the direction toward the front side of the position detecting device 1). For example, any one of the left hand P5, the right hand P6, the left foot P10, and the right foot P11 is preset as the reference body part.

The evaluation unit 70 according to this modified example gives a better evaluation to the player in a case where the body part acquired by the body part information acquiring unit 58 is the body part included in the upper limb or the lower limb on the opposite side to the one side, than in a case where the body part acquired by the body part information acquiring unit 58 is the body part included in the upper limb or the lower limb on the opposite side. The opposite side (that is the other side) to the upper limb or the lower limb on the one side means that the opposite side to the right upper limb or the right lower limb is the left upper limb or the left lower limb, and the opposite side to the left upper limb or the left lower limb is the right upper limb or the right lower limb.

For example, the case where the upper limb or the lower limb of the player corresponding to the reference position is the right hand P6 or the right foot P11 means that the reference position is easy to touch by using the right hand P6 or the right foot P11, and hence a better evaluation is given in a case where the ripple action is performed by using the left hand P5 or the left foot P10 corresponding to the upper limb or the lower limb on the opposite side. In the same manner, the case where the upper limb or the lower limb of the player corresponding to the reference position is the left hand P5 or the left foot P10 means that the reference position is easy to touch by using the left hand P5 or the left foot P10, and hence a better evaluation is given in a case where the ripple action is performed by using the right hand P6 or the right foot P11 corresponding to the upper limb or the lower limb on the opposite side.

According to this modified example, by detecting the fact that the player performed the ripple action by using the hand or the foot on the opposite side, it is possible to accurately evaluate the gameplay of the player who performs the ripple action while twisting their body.

(1-3) Further, for example, various kinds of effect processing with regard to the reference image 34 or the guide image 36 may be executed in a case where the hit trick is successful.

The display control unit 72 according to this modified example includes means for displaying on a display screen an image (for example, reference image 34 or guide image 36) for showing the player the reference time and the reference position. Further, the display control unit 72 includes means for changing a display mode of the image based on an evaluation result obtained by the evaluation unit 70. The meaning of the phrase "changing the display mode of the image" includes changing the size, shape, color, brightness, and pattern of the image and subjecting the image to given effect processing.

The display control unit 72 includes means for determining a method of changing the display mode of the image based on the kind of body part acquired by the body part information acquiring unit 58. For example, the display control unit 72 changes the reference image 34 or the guide image 36 in a first mode in a case where the hit trick is successful, and changes the reference image 34 or the guide image 36 in a second mode in a case where the hit trick is not successful.

Figure 24:
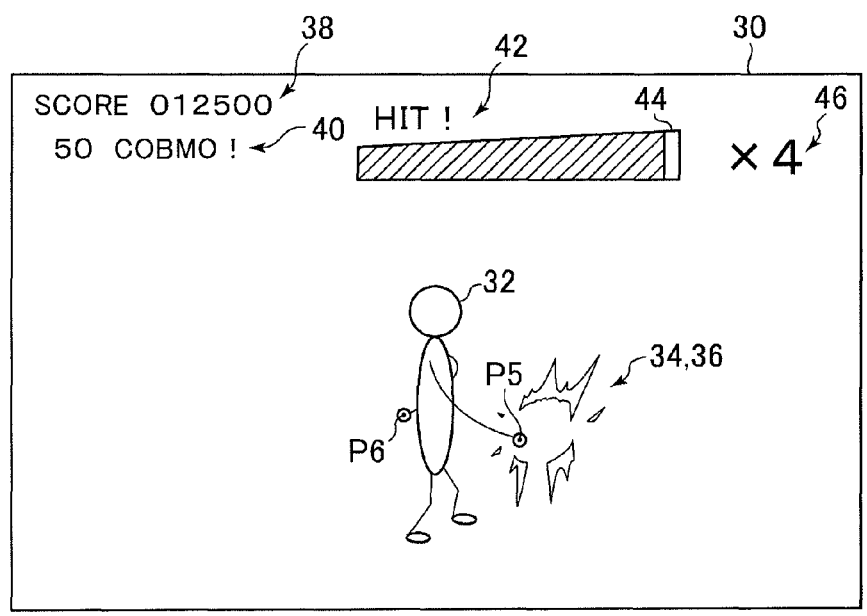
FIG. 24 illustrates an example of game screen according to Modified Example (1-3)

FIG. 24 illustrates an example of the game screen 30 according to Modified Example (1-3). As illustrated in FIG. 24, in a case where the hit trick is successful, the reference image 34 or the guide image 36 may burst and disappear. For example, the kind of body part may be stored in the game data storage unit 52 in association with information indicating how to change the size, shape, color, brightness, and pattern of the image, or information for identifying the effect processing to be performed on the image. In this case, the reference image 34 or the guide image 36 changes based on the information associated with the kind of body part acquired by the body part information acquiring unit 58.

According to this modified example, the effect processing for the image may differ based on the body part used by the player to perform the ripple action.

(7-2. Modified Example Relating to the Rhythm Trick)

(2-1) Further, for example, in the embodiment, the description is directed to the case where the rhythm trick is evaluated by referring only to the direction change time of the body part, but the criterion for the successful rhythm trick may be set as whether or not the body part is being swayed at a certain level of amplitude.

The game device 20 according to this modified example includes movement amount determination means for determining based on the change in position of the body part whether or not a movement amount of the body part is equal to or larger than a reference amount between one direction change time and a subsequent direction change time thereto (between direction change times). The means is implemented by, for example, the game execution unit 54. For example, a distance (amplitude in the case of the reciprocation) between the three-dimensional coordinates indicated by the player body part information obtained in the case where a given direction change time is acquired and the three-dimensional coordinates indicated by the player body part information obtained in the case where the subsequent direction change time is acquired is acquired as the movement amount. The reference amount may be a predefined value, or may be defined based on the situation of the game or the size of the body of the player.

The evaluation unit 70 according to this modified example evaluates the gameplay of the player based on a determination result obtained by the movement amount determination means and the comparison result obtained by the time comparison unit 64. For example, in a case where the movement amount of the body part is equal to or larger than the reference amount, and in a case where a lag between the times is within the threshold value, the evaluation unit 70 may determine that the rhythm trick is successful and gives a better evaluation to the player.

According to this modified example, it is determined that the rhythm trick is successful in a case where the player sways their body part significantly, and hence it is possible to request the player to perform a large movement and dance dynamically.

(2-2) Further, for example, in a case where the tempo of the music track becomes fast, there is a possibility that the player may fail to sway their body part significantly. Therefore, the reference amount described in Modified Example (2-1) may be set based on the tempo of the music track.

The game device 20 according to this modified example includes means for setting the reference amount based on the tempo of the music track. The means is implemented by, for example, the game execution unit 54. The reference amount is set to become smaller as the tempo of the music track becomes faster. For example, the criterion relating to the tempo of the music track and the reference amount may be stored in the game data storage unit 52 in association with each other. In this case, the reference amount associated with the above-mentioned criterion satisfied by the tempo of the music track indicated by the music track data is set.

According to this modified example, it is possible to accurately perform the determination of the rhythm trick based on the tempo of the music track.

(2-3) Further, for example, the description is directed to the case where the rhythm trick becomes successful even if the player sways their body only once, but the rhythm trick may be successful only if the player is swaying their body like an actual dancer in time with the music track for a fixed period. For example, the rhythm trick may be determined to be successful in a case where the player is swaying their hips in time with the music track for a duration equal to or longer than one beat of the music track.

The game device 20 according to this modified example includes restriction means for restricting execution of evaluation processing performed by the evaluation unit 70. The means is implemented by, for example, the game execution unit 54. The phrase "restricting the execution of the evaluation processing" represents inhibiting a better evaluation from being given to the player, for example, inhibiting the rhythm trick from being determined to be successful.

Further, the game device 20 includes means for determining whether or not a state in which the lag between the direction change time and the time defined based on the beat of the music track is equal to or smaller than the reference value has been maintained for a predetermined period. The means is implemented by, for example, the game execution unit 54. For example, the time measurement is started in a case where the lag becomes equal to or smaller than the reference value in Step S204, and it is determined whether or not the state in which the lag is equal to or smaller than the reference value has been maintained for a period equal to or larger than a fixed period. Further, for example, in Step S204, it may be determined whether or not the number of times that the lag was consecutively determined to be equal to or smaller than the reference value is equal to or larger than a fixed number of times.

Further, the game device 20 includes means for lifting the restriction of the execution of the evaluation processing which is performed by the restriction means in a case where it is determined that the state in which the lag is equal to or smaller than the reference value has been maintained for the predetermined period. The means is implemented by, for example, the game execution unit 54. The phrase "lifting the restriction of the execution of the evaluation processing" represents allowing a better evaluation to be given to the player, for example, determining that the rhythm trick is successful.

According to this modified example, the rhythm trick can be determined to be successful in a case where the player is swaying their body to the rhythm of the music track for a fixed period, and hence it is possible to request the player to perform a higher level action.

(2-4) Further, for example, in a case where the rhythm trick is successful, effect processing to splash paint onto the position of the waist or the like of the character 32 may be executed.

The game device 20 according to this modified example includes means for displaying the player image or the character 32 on the display screen, the player image being obtained by continuously photographing the player by the photographing means, the character 32 performing the action corresponding to the action of the player based on the position information. The means is implemented by the display control unit 72. Note that in the embodiment, the description is directed to the case where the character 32 is displayed, but the player image may be displayed by acquiring the photographed image from the position detecting device 1.

Figure 25:
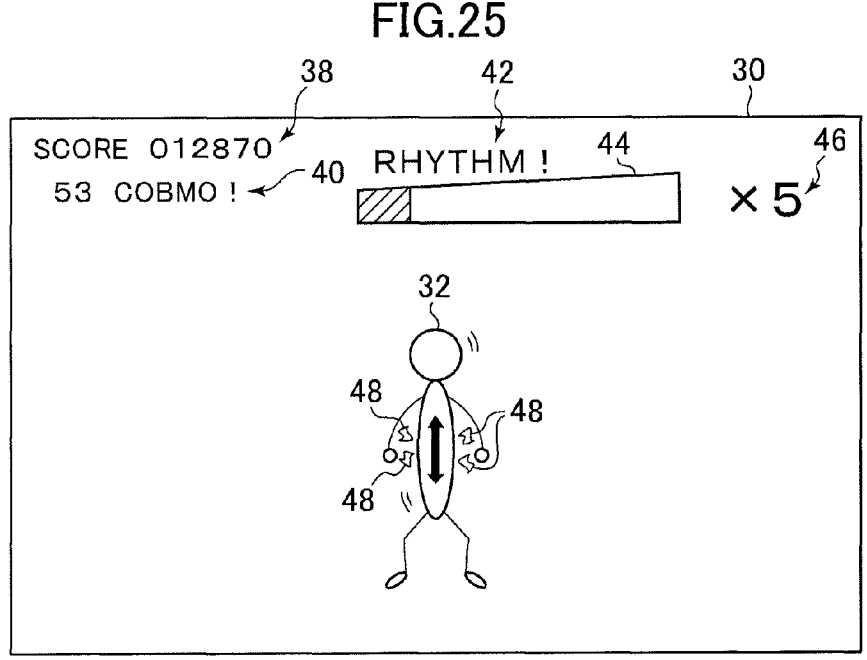
FIG. 25 illustrates an example of a game screen according to Modified Example (2-4)

FIG. 25 illustrates an example of the game screen 30 according to Modified Example (2-4). As illustrated in FIG. 25, in a case where the rhythm trick is successful, a given image 48 is displayed around the body part within the character 32 which is being used by the player to perform the direction changing action.

The game device 20 according to this modified example includes means for displaying a given image in the position corresponding to the body part of the player image or the character 32, based on the comparison result obtained by the time comparison unit 64. The means is implemented by the display control unit 72. For example, based on the chronological change of the player body part information, the body part used by the player to perform the direction changing action is acquired, and the given image is displayed in the position corresponding to the body part.

According to this modified example, it is possible to produce an effect on the game screen 30 in a case where the player succeeds in the rhythm trick.

(2-5) Further, for example, the ripple action may be determined only in a case where the player succeeds in the rhythm trick. That is, unless the player is swaying their body in rhythm to the music track, the score of the player may be inhibited from increasing even if the player touches the reference position at the reference time.

The game device 20 according to this modified example includes means for restricting the execution of the comparison processing performed by the ripple action determination unit 56 or the execution of the evaluation processing performed by the evaluation unit 70, based on the comparison result obtained by the time comparison unit 64. The means is implemented by, for example, the game execution unit 54. The phrase "restricting the execution of the comparison processing performed by the ripple action determination unit 56" represents inhibiting the execution of the comparison processing between the body part and the reference position, which is performed by the ripple action determination unit 56.

According to this modified example, the increase in the score is restricted unless the player performs the rhythm trick, and hence it is possible to encourage the player to perform the rhythm trick.

(7-3. Modified Example Relating to the Pose Trick)

(3-1) Further, for example, by executing special effect processing relating to the character 32 in a case where the pose trick is successful, the player may be encouraged to perform the pose trick.

The game device 20 according to this modified example includes means for displaying an outline image having a shape corresponding to the outline of the player image or the outline of the character 32 in the position corresponding to the player image or the character 32, respectively, in a case where the body part that moved at the speed equal to or faster than the reference speed comes into the substantially stopped state (pose state) after having moved. The means is implemented by the display control unit 72.

Figure 26:
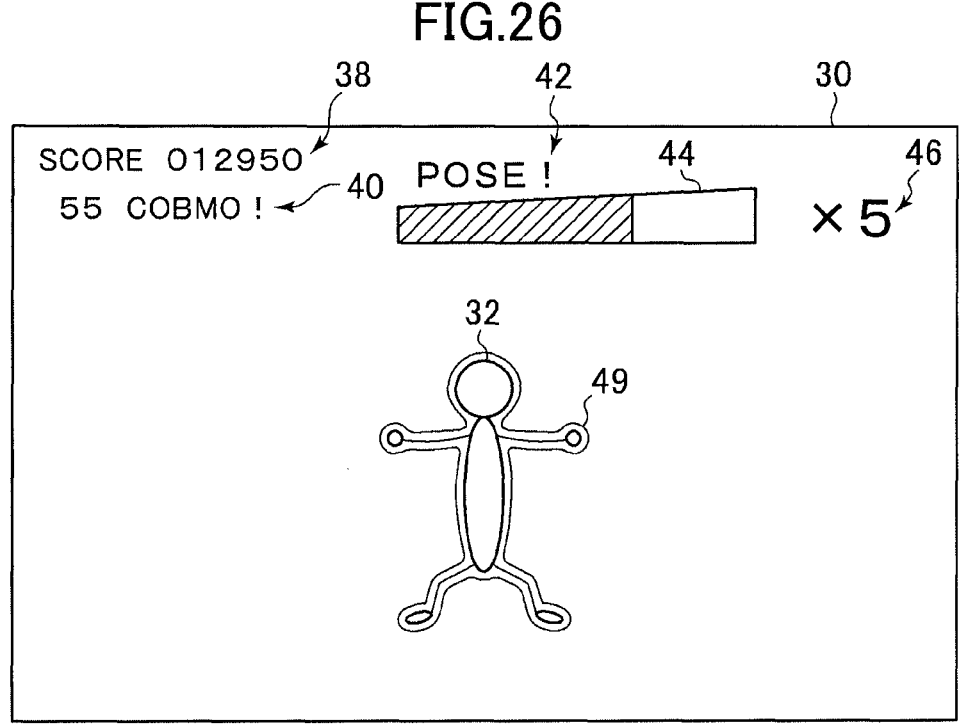
FIG. 26 is a diagram illustrating an example of a game screen according to Modified Example (3-1)

FIG. 26 is a diagram illustrating an example of the game screen 30 according to Modified Example (3-1). As illustrated in FIG. 26, an outline image 49 is generated by extracting the outline portion of the character 32. That is, an image generated based on an image obtained by cutting out the outline portion from the character 32 is set as the outline image 49. In this case, a line having a given width indicating the outline of the character 32 defines the outline image 49.

The phrase "position corresponding to the player image or the character 32" represents a display position defined based on the display position of the player image or the display position of the character 32, and is a position in which the outline image 49 is displayed so as to surround the player image or a character or a position in which the outline image 49 is displayed so as to be surrounded by the outline of the player image or the outline of the character.

The game device 20 according to this modified example includes outline image control means for gradually changing the outline image 49 in size as the duration of the pose state increases. The means is implemented by the display control unit 72. The phrase "gradually changing the outline image 49 in size" represents changing the outline image 49 in size so that a difference in size between the outline image 49 and the outline of the player image or the outline of the character corresponds to the duration of the pose state.

Figure 27:
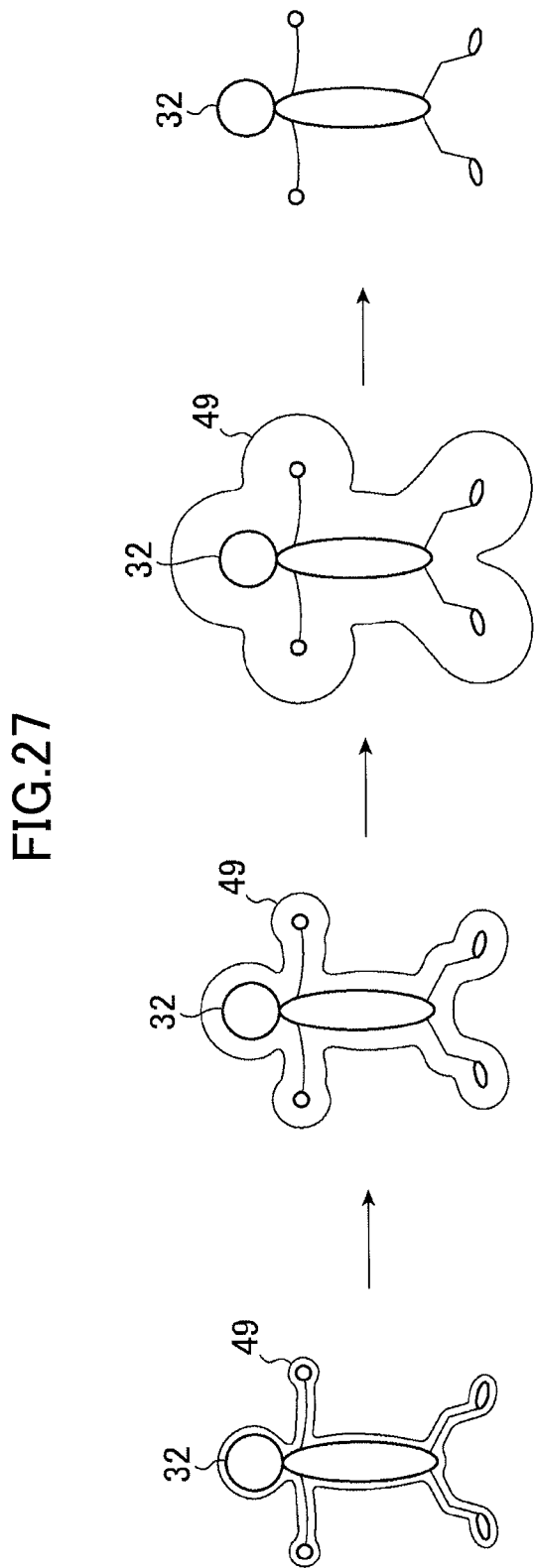
FIG. 27 is a diagram for illustrating a method of changing a size of an outline image.

FIG. 27 is a diagram for illustrating a method of changing a size of the outline image 49. As illustrated in FIG. 27, in a case where the player comes into the pose state, the outline image 49 is generated so as to be superposed on or be adjacent to the outline of the character 32, and then gradually grows in size. In this case, the outline image control means includes first means for gradually changing the outline image 49 in size based on the duration of the pose state in a case where the duration of the pose state has not reached the reference period. An enlargement speed or a reduction speed of the outline image 49 used in this case may be predefined or may change based on the situation of the game.

As illustrated in FIG. 27, in a case where the pose trick is successful, the outline image 49 abruptly becomes large and is then erased from the screen. In this case, the outline image control means includes second means for, in a case where the duration of the pose state reaches the reference period, changing the outline image 49 in size at a faster speed than the first means (which means that an enlargement rate or a reduction rate per unit time is higher) and then erasing the outline image 49 from the display screen.

According to this modified example, it is possible to show the player whether or not the pose trick is successful based on the change in size of the outline image 49.

(3-2) Further, for example, other effect processing may be performed to show the player whether or not the pose trick is successful.

FIG. 28 is a diagram for illustrating a method of changing the size of the outline image 49 according to Modified Example (3-2). As illustrated in FIG. 28, in a case where the player comes into the pose state, the outline image 49 larger than the character 32 may be displayed, and the outline image 49 may be changed in size so that the difference between the period during which the pose state is maintained and the reference period corresponds to the difference between the size of the outline image 49 and the size of the character 32. In this case, the outline image control means gradually reduces the outline image 49, which is larger than the player image or the character 32, based on the duration of the state, so that in a case where the duration of the pose state reaches the reference period, the outline image 49 substantially coincides with the outline of the player image or the outline of the character 32.

Further, in a case where the player comes into the pose state, the outline image 49 smaller than the character 32 may be displayed, and the outline image 49 may be changed in size so that the difference between the period during which the pose state is maintained and the reference period corresponds to the difference between the size of the outline image 49 and the size of the character 32. In this case, the outline image control means gradually increases the outline image 49, which is smaller than the player image or the character, based on the duration of the state, so that in a case where the duration of the pose state reaches the reference period, the outline image 49 substantially coincides with the outline of the player image or the outline of the character 32.

According to this modified example, it is possible to show the player whether or not the pose trick is successful in a case where the size of the outline image 49 becomes the same as the size of the character 32.

(3-3) Further, for example, the outline image 49 may be erased halfway in a case where the player fails to maintain the pose state for the reference period.

The game device 20 according to this modified example includes means for restricting, in a case where the body part that moved at the speed equal to or faster than the reference speed comes into the substantially stopped state after having moved and then stops maintaining the state before the duration of the state reaches the reference period, the execution of the display control processing for the outline image 49 which is performed by the outline image control means and erasing the outline image 49 from the display screen. The means is implemented by the display control unit 72. The phrase "restriction of the execution of the display control processing" represents inhibiting the outline image 49 from being displayed.

According to this modified example, it is possible to show the player that the pose trick is not successful.

(3-4) Further, for example, the ripple action may be determined only in a case where the player succeeds in the pose trick.

The game device 20 according to this modified example includes means for restricting the execution of the comparison processing which is performed by the ripple action determination unit 56 or the execution of the evaluation processing which is performed by the evaluation unit 70 in a case where it is not determined that the body part that moved at the speed equal to or faster than the reference speed has maintained for a period equal to or longer than the reference period the substantially stopped state after having moved. The means is implemented by the game execution unit 54.

According to this modified example, the increase in the score is restricted unless the player performs the pose trick, and hence it is possible to encourage the player to perform the pose trick.

(3-5) Further, for example, it may be set as the criterion for the successful pose trick that their hand or foot maintained the substantially stopped state before the hand or foot of the player is moved at the speed equal to or faster than the reference speed.

The game device 20 according to this modified example further includes means for determining, based on the position information, whether or not at least one of the plurality of body parts is in the substantially stopped state. The means is implemented by the game execution unit 54. The determination method is the same as the determination method performed by the stop determination unit 68.

After it is determined that at least one of the plurality of body parts is in the substantially stopped state, the movement determination unit 66 according to this modified example determines whether or not the body part that was in the substantially stopped state has moved at the speed equal to or faster than the reference speed.

According to this modified example, it is possible to accurately evaluate an action such as striking a pose by abruptly moving a body part that was at rest.

(3-6) Further, for example, the moving speed of the body part used to strike a pose differs based on the tempo of the music track, and hence the reference speed may be changed based on the tempo of the music track.

The game device 20 according to this modified example further includes means for setting the reference speed based on the tempo of the music track. The means is implemented by the game execution unit 54. The reference speed is set to become faster as the tempo of the music track becomes faster. For example, the criterion relating to the tempo of the music track and the reference speed may be stored in the game data storage unit 52 in association with each other. Set in this case is the reference speed associated with the above-mentioned criterion satisfied by the tempo of the music track indicated by the music track data.

According to this modified example, it is possible to evaluate whether or not a pose was struck at a speed suitable for the tempo of the music track.

(3-7) Further, for example, the time required to maintain the pose state may differ based on the tempo of the music track.

The game device 20 according to this modified example further includes means for setting the length of the reference period based on the tempo of the music track. The means is implemented by the game execution unit 54. The reference period may be set to become shorter as the tempo of the music track becomes faster. For example, the criterion relating to the tempo of the music track and the length of the reference period may be stored in the game data storage unit 52 in association with each other. Set in this case is the reference period having a length associated with the above-mentioned criterion satisfied by the tempo of the music track indicated by the music track data.

According to this modified example, it is possible to evaluate whether or not a pose was struck for the period suitable for the tempo of the music track.

(7-4. Other Modified Example)

(4) Further, for example, in the embodiment, the description is directed to the case where various kinds of determination processing are performed based on the information indicating the position within the real space of each of the body parts of the player, but any information that relates to the body part of the player may be used, and in addition, for example, the position within the display screen or a virtual space of the body part of the player may be used.

In this case, the position information acquiring unit 50 acquires the position information relating to the positions within the display screen or the virtual space, which correspond to the positions within the real space of the plurality of body parts (hereinafter, referred to simply as "positions within the display screen or the virtual space of the body part"). The phrase "positions within the display screen, which correspond to the positions within the real space of the plurality of body parts" represents the positions of the respective body parts of the player which are reflected on the photographed image, for example, two-dimensional coordinates of the body parts identified by pattern matching. The phrase "positions within the virtual space corresponding to the positions within the real space of the plurality of body parts" represents the positions within the virtual space which are set based on the player body part information, for example, the positions of the respective body parts of the character 32 located in the virtual space.

In this modified example, for example, the reference position is the position which is set within the display screen or the virtual space, and the determination region is also set within the display screen or the virtual space. The ripple action determination unit 56 determines whether or not the position within the display screen or the virtual space of the body part falls within the determination region including the reference position which is set within the display screen or the virtual space.

Further, the action determination unit 60 determines whether or not the direction changing action has been performed by the player, based on the change in position within the display screen or the virtual space of the body part. The movement determination unit 66 and the stop determination unit 68 perform the determination based on the position within the display screen or the virtual space of the body part.

(5) Further, for example, in the embodiment, the description is directed to the case of determining the ripple action based on whether or not the player placed their body part in the reference position at the reference time, but the lag between the reference time and the time at which the player placed their body part in the determination region 82 may be evaluated.

The ripple action determination unit 56 according to this Modified Example (5) includes: means for determining whether or not at least one of the plurality of body parts within the period corresponding to the reference time exists within the determination region 82 including the reference position; and means for determining whether or not the lag between the reference time and the time at which at least one of the plurality of body parts was located within the determination region 82 is equal to or smaller than a predetermined value.

For example, the evaluation unit 70 evaluates the gameplay of the player based on the above-mentioned lag. For example, a better evaluation is given to the player as the lag becomes smaller.

In a case where the lag between the reference time and the time at which at least one of the plurality of body parts was located within the determination region 82 is equal to or smaller than the predetermined value, the body part information acquiring unit 58 according to this Modified Example (5) acquires the body part information relating to the kind of body part. Also in this case, the kind of body part is acquired by referring to the player body part information.

According to Modified Example (5), it is possible to evaluate the gameplay of the player based on the lag between the reference time and the time at which the player placed their body part within the determination region 82.

(6) Further, for example, various numerical values stated in the embodiment and the modified examples may be larger or smaller than the numerical values described above. Those numerical values may be any values that are previously designated or calculated based on a given mathematical expression.

Further, the description is directed to the case where the music track data includes information indicating the time of the beat of the music track, but the information may not be included in the music track data. The time at which the beat of the music track is made may be acquired based on the information indicating the tempo of the music track. Further, the music track may not always be output.

Further, a data storage example for the reference data is not limited to the example of the embodiment. The reference data may be any data in which the reference time and the reference position are associated with each other. In addition, for example, information for identifying the body part and the score given to the player may be associated with the reference time and the reference position. In this case, the score associated with the body part used by the player to perform the ripple action is given.

Further, for example, the description is directed to the case where the rhythm trick is determined to be successful in a case where the player performs the reciprocation in a given rhythm, but the determination processing for the rhythm trick may be executed based on a direction changing movement performed by the player. In addition, for example, the determination processing for the rhythm trick may be performed based on the direction change time applied in a case where the player moves their hand or foot along a triangle or a rectangle.

Further, for example, in the above-mentioned, the description is given by taking the example in which the means for generating the position information based on the photographed image and the depth information (depth image) is included in the position detecting device 1, but the means for generating the position information may be included in the game device 20. For example, the game device 20 may receive the photographed image and the depth image from the position detecting device 1, and may generate the position information based thereon. Further, for example, the position detecting device 1 may be integrated with the game device 20, and the position detecting device 1 may be included in the game device 20.

Further, the description is directed to the case where the hit trick, the rhythm trick, and the pose trick are performed on the game device 20, but it may suffice that only one or two thereof are performed. Further, for example, in a case where the hit trick is not performed, the determination processing for the ripple action may not be performed. That is, the present invention may also be applied to a game configured so that it is evaluated only whether or not the rhythm trick or the pose trick is successful.

For example, in the case where only the hit trick is determined, the action determination unit 60, the direction change time acquiring unit 62, the time comparison unit 64, the movement determination unit 66, and the stop determination unit 68 may not be included in the game device 20. Further, in the case where only the rhythm trick is determined, the ripple action determination unit 56, the body part information acquiring unit 58, the movement determination unit 66, and the stop determination unit 68 may not be included in the game device 20. Further, in the case where only the pose trick is determined, the ripple action determination unit 56, the body part information acquiring unit 58, the action determination unit 60, the direction change time acquiring unit 62, and the time comparison unit 64 may not be included in the game device 20.

Further, at least two of the above-mentioned embodiment and modified examples may be combined.

Further, in the embodiment, the description is directed to the case where the ripple action, the hit trick, the rhythm trick, and the pose trick are determined based on a specific body part such as a hand or a foot among the body parts of the player, but an arbitrary body part may be used for the determination thereof. In addition, for example, the positions of the body parts such as a wrist, an arm, an elbow, an ankle, a shin, a knee, and a thigh may be detected, and the ripple action or each kind of trick may be determined based on those body parts.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A game device, which controls a game configured so that a player aims to locate at least one of a plurality of body parts of the player in a given position at a given time, the game device comprising at least one microprocessor configured to:
   acquire, from at least one image of a captured region of the player in real space, position information relating to positions of the plurality of body parts of the player in the real space;
   acquire reference data from a storage that stores the reference data obtained by associating a reference time with a reference position for each body part, wherein the reference data is associated with a reference body part;
   determine, in a determination, whether a position of at least one of the plurality of body parts exists within a determination region for the at least one body part using the acquired position information, the determination region being a subset of the captured region comprising the reference position for the at least one body part at a time point corresponding to the reference time;
   acquire body part information relating to a kind of the at least one of the plurality of body parts determined to exist within the determination region; and
   control an evaluation of the player based on a result of the determination and the acquired body part information by comparing the kind of body part indicated by the acquired body part information and the reference body part and controlling the evaluation of the player based on a result of the comparison,
   wherein the position information relating to the positions of the plurality of body parts comprises coordinates of the plurality of body parts in the real space, and the reference position for each body part comprises reference coordinates for each body part at the reference time.

2. The game device according to claim 1, wherein the at least one microprocessor:
   determines whether at least two of the plurality of body parts exist within the determination region at the time point corresponding to the reference time;
   acquires the body part information relating to a combination of the kinds of the at least two of the plurality of body parts determined to exist within the determination region; and controls the evaluation of the player based on the combination of the kinds of the acquired at least two of the plurality of body parts.

3. The game device according to claim 1, wherein:
the reference data is associated with a corresponding one of the plurality of body parts included in one of an upper limb and a lower limb on one side of the player corresponding to the reference position; and
the at least one microprocessor gives a better evaluation to the player in a case where the acquired at least one of the plurality of body parts is a body part included in one of the upper limb and the lower limb on an opposite side to the one side, than in a case where the acquired at least one of the plurality of body parts is a body part included in one of the upper limb and the lower limb on the one side.

4. The game device according to claim 1, wherein the at least one microprocessor:
displays an image for showing the player the reference time and the reference position on a display screen;
changes a display mode of the image based on the evaluation; and
determines a method of changing the display mode of the image based on the kind of the acquired at least one of the plurality of body parts.

5. The game device according to claim 1, wherein the at least one microprocessor:
changes a score of the player based on the determination; and
determines a change amount of the score of the player based on the kind of the acquired at least one of the plurality of body parts; and
controls the evaluation of the player by changing the score of the player by the determined change amount.

6. The game device according to claim 1, wherein:
the reference position comprises a position which is set in a real space;
the acquired position information comprises position information relating to the positions within the real space of the plurality of body parts; and
the at least one microprocessor determines whether the position within the real space of the at least one of the plurality of body parts falls within the determination region comprising the reference position which is set in the real space at the time point corresponding to the reference time.

7. The game device according to claim 1, wherein:
the reference position comprises a position which is set within one of a display screen and a virtual space;
the acquired position information comprises position information relating to the positions within the one of the display screen and the virtual space of the plurality of body parts corresponding to the positions within a real space of the plurality of body parts; and
the at least one microprocessor determines whether the position within the one of the display screen and the virtual space of the at least one of the plurality of body parts corresponding to the position within the real space of the at least one of the plurality of body parts falls within the determination region comprising the reference position which is set within the one of the display screen and the virtual space at the time point corresponding to the reference time.

8. The game device according to claim 1, wherein:
the at least one microprocessor determines whether the at least one of the plurality of body parts exists within the determination region comprising the reference position at the reference time; and
the at least one microprocessor acquires the body part information relating to the kind of the at least one of the plurality of body parts of the player determined to exist within the determination region at the reference time.

9. The game device according to claim 1, wherein:
the determination comprises:
determining whether the at least one of the plurality of body parts within a period corresponding to the reference time exists within the determination region comprising the reference position; and
determining whether a lag between the reference time and a time at which the at least one of the plurality of body parts is located within the determination region is equal to or smaller than a threshold value; and
the the at least one microprocessor acquires the body part information relating to the kind of the at least one of the plurality of body parts in a case where the lag between the reference time and the time at which the at least one of the plurality of body parts is located within the determination region is determined to be equal to or smaller than the threshold value.

10. The game device according to claim 1, wherein:
the game comprises a game configured so that the player moves the body part of the player in time with a music track;
the at least one microprocessor is configured to:
determine whether an action of changing a direction of the body part has been performed by the player based on a change in position of the body part;
acquire a direction change time for the body part during the action; and
compare, in a time comparison, the direction change time with a time defined based on a beat of the music track; and
the at least one microprocessor controls the evaluation of the player based on the comparison result.

11. The game device according to claim 10, wherein the at least one microprocessor:
determines, in an action determination, whether reciprocation of the body part has been performed by the player based on the change in position of the body part;
acquires a turning-back time at which the body part turns back during the reciprocation as the direction change time; and
compares, in the time comparison, the turning-back time with the time defined based on the beat of the music track.

12. The game device according to claim 10, wherein the at least on microprocessor:
determines, in a movement amount determination, whether a movement amount of the body part between one direction change time and a subsequent direction change time thereto is equal to or larger than a reference amount, based on the change in position of the body part, and
controls the evaluation of the player based on the movement amount determination and a result of the time comparison.

13. The game device according to claim 12, wherein the reference amount is set based on a tempo of the music track.

14. The game device according to claim 10, wherein the at least one microprocessor:
- restricts execution of the control of the evaluation;
- determines whether a state in which a lag between the direction change time and the time defined based on the beat of the music track is equal to or smaller than a reference value has been maintained for a threshold period; and
- removes the restriction in a case where it is determined that the state in which the lag is equal to or smaller than the reference value has been maintained for the threshold period.

15. The game device according to claim 10, wherein the at least one microprocessor:
- displays one of a player image and a character on a display screen, the player image being obtained by continuously photographing the player by a camera, the character performing an action corresponding to the action of the player based on the position information; and
- displays a given image in a position corresponding to the body part of the one of the player image and the character based on the comparison result.

16. The game device according to claim 10, wherein the at least one microprocessor:
- compares, in a position comparison, the position of the at least one of the plurality of body parts at the time point corresponding to the reference time with the reference position;
- determines whether the action of changing the direction of the at least one of the plurality of body parts has been performed by the player, based on the change in position of the at least one of the plurality of body parts; and
- controls the evaluation of the player based on the results of the position comparison and the time comparison.

17. The game device according to claim 16, wherein the at least one microprocessor restricts one of execution of the position comparison and execution of the control of the evaluation based on a result of the time comparison.

18. The game device according to claim 16, wherein the at least one microprocessor:
- changes a score of the player based on the position comparison; and
- determines a change amount of the score of the player based on a result of the time comparison; and
- the at least one microprocessor changes the evaluation of the player by the determined change amount.

19. The game device according to claim 10, wherein:
- the at least one microprocessor acquires information relating to the position within a real space of the body part of the player; and
- the at least one microprocessor determines whether the action of changing the direction of the body part has been performed by the player, based on the change in position within the real space of the body part.

20. The game device according to claim 10, wherein:
- the at least one microprocessor acquires information relating to the position within one of a display screen and a virtual space of the body part of the player corresponding to the position within a real space of the body part of the player; and
- the at least one microprocessor determines whether the action of changing the direction of the body part has been performed by the player, based on the change in position within the one of the display screen and the virtual space of the body part of the player corresponding to the position within the real space of the body part of the player.

21. A game device, which executes a game configured so that a player aims to locate at least one of a plurality of body parts of the player in a given position at a given time, the game device comprising at least one microprocessor configured to:
- acquire position information relating to positions of the plurality of body parts of the player;
- acquire reference data from a storage that stores the reference data obtained by associating a reference time with a reference position for each body part;
- determine whether a position of at least one of the plurality of body parts exists within a determination region for the at least one body part using the acquired position information, the determination region comprising the reference position for the at least one body part at a time point corresponding to the reference time;
- acquire body part information relating to a kind of the at least one of the plurality of body parts determined to exist within the determination region; and
- evaluate gameplay of the player based on the kind of the acquired at least one of the plurality of body parts, wherein:
the game comprises a game configured so that the player moves the body part of the player in time with a music track; and
the at least one microprocessor is further configured to:
- determine, in a movement determination based on the position information, whether the at least one of the plurality of body parts has moved at a speed equal to or faster than a reference speed; and
- determine, in a stop determination based on the position information, whether the at least one of the plurality of body parts that moved at the speed equal to or faster than the reference speed has maintained a substantially stopped state for a reference period after having moved, in a case where it is determined in the movement determination that the at least one of the plurality of body parts has moved at the speed equal to or faster than the reference speed; and the at least one microprocessor evaluates the gameplay of the player based on a result of the stop determination.

22. The game device according to claim 21, wherein the at least one microprocessor is further configured to:
- display one of a player image and a character on a display screen, the player image being obtained by continuously photographing the player by a camera, the character performing an action corresponding to the action of the player based on the position information;
- display an outline image having a shape corresponding one of an outline of the player image and an outline of the character in a position corresponding to the one of the player image and the character in a case where at least one of the plurality of body parts that moved at the speed equal to or faster than the reference speed comes into the substantially stopped state after having moved; and
- controlling the outline image by gradually changing the outline image in size as a duration of the substantially stopped state increases.

23. The game device according to claim 22, wherein the controlling the outline image comprises gradually changing the outline image in size based on the duration of the state in a first case where the duration of the substantially stopped state has not reached the reference period; and in a case where the duration of the state reaches the reference period, changing the outline image in size at a faster speed than the first case and then erasing the outline image from the display screen.

24. The game device according to claim 22, wherein the outline image is controlled by at least one of:

gradually reducing the outline image, which is larger than the one of the player image and the character, based on the duration of the state, so that in a case where the duration of the substantially stopped state reaches the reference period, the outline image substantially coincides with the one of the outline of the player image and the outline of the character; and gradually increasing the outline image, which is smaller than the one of the player image and the character, based on the duration of the state, so that in a case where the duration of the substantially stopped state reaches the reference period, the outline image substantially coincides with the one of the outline of the player image and the outline of the character.

25. The game device according to claim 22, wherein the at least one microprocessor, in a case where the at least one of the plurality of body parts that moved at the speed equal to or faster than the reference speed comes into the substantially stopped state after having moved and then stops maintaining the substantially stopped state before the duration of the substantially stopped state reaches the reference period, restricts execution of display control processing on the outline image and erases the outline image from the display screen.

26. The game device according to claim 21, wherein the at least one microprocessor:

compares the position of the at least one of the plurality of body parts at the time point corresponding to the reference time with the reference position, wherein:

determines, in a movement determination based on the position information, whether the at least one of the plurality of body parts moved at the speed equal to or faster than the reference speed between one reference time and a subsequent reference time thereto;

determines in a stop determination whether the at least one of the plurality of body parts that moved at the speed equal to or faster than the reference speed maintained the substantially stopped state for the reference period after having moved between the one reference time and the subsequent reference time thereto; and evaluates the gameplay of the player based on a result of the comparison and the stop determination.

27. The game device according to claim 26, wherein:

the at least one microprocessor:

changes a score of the player based on the result of the comparison; and determines a change amount of the score of the player based on the stop determination; and evaluates the gameplay of the player by changing the score of the player by the determined change amount.

28. The game device according to claim 26, wherein the at least one microprocessor restricts one of execution of comparison processing and execution of evaluation processing in a case where it is not determined that the at least one of the plurality of body parts that moved at the speed equal to or faster than the reference speed has maintained the substantially stopped state for a period equal to or longer than the reference period after having moved.

29. The game device according to claim 21, wherein:

the position information comprises position information relating to positions of at least one hand and at least one foot of the player;

the movement determination determines, based on the position information, whether the at least one hand and the at least one foot of the player have moved at the speed equal to or faster than the reference speed; and the stop determination determines, based on the position information, whether the at least one hand and the at least one foot have maintained the substantially stopped state for the reference period after having moved in a case where it is determined that the at least one hand and the at least one foot of the player have moved at the speed equal to or faster than the reference speed.

30. The game device according to claim 21, wherein the at least one microprocessor determines, based on the position information, whether the at least one of the plurality of body parts is in the substantially stopped state, wherein the movement determination determines, after it is determined that the at least one of the plurality of body parts is in the substantially stopped state, whether the at least one of the plurality of body parts that is in the substantially stopped state has moved at the speed equal to or faster than the reference speed.

31. The game device according to claim 21, further the reference speed is set based on a tempo of the music track.

32. The game device according to claim 21, a length of the reference period is set based on a tempo of the music track.

33. The game device according to claim 21, wherein the stop determination comprises determining whether the at least one of the plurality of body parts that moved at the speed equal to or faster than the reference speed is in the substantially stopped state by determining whether the at least one of the plurality of body parts exists within a range defined based on the position of the at least one of the plurality of body parts after having moved, and determining whether the at least one of the plurality of body parts has maintained the position within the range for the reference period.

34. The game device according to claim 21, wherein the stop determination comprises determining whether the at least one of the plurality of body parts that moved at the speed equal to or faster than the reference speed is in the substantially stopped state by determining whether the at least one of the plurality of body parts has decelerated to a moving speed of substantially zero after having moved, and determining whether the at least one of the plurality of body parts has maintained the moving speed of substantially zero for the reference period.

35. The game device according to claim 21, wherein:

the position information comprises position information relating to the positions within a real space of the plurality of body parts of the player;

the movement determination determines whether the player has moved the at least one of the plurality of body parts at the speed equal to or faster than the reference speed, based on the positions within the real space of the plurality of body parts; and the stop determination determines, in a case where it is determined that at least one of the plurality of body parts has been moved at the speed equal to or faster than the reference speed, whether the at least one of the plurality of body parts that moved at the speed equal to or faster than the reference speed has maintained the substantially stopped state for a period equal to or longer than the reference period, based on the position within the real space of the at least one of the plurality of body parts that moved at the speed equal to or faster than the reference speed.

36. The game device according to claim 21, wherein:
the position information comprises position information relating to the positions within one of a display screen and a virtual space of the plurality of body parts of the player corresponding to the positions within a real space of the plurality of body parts of the player;
the movement determination determines whether the player has moved the at least one of the plurality of body parts at the speed equal to or faster than the reference speed, based on the positions within the one of the display screen and the virtual space of the plurality of body parts of the player corresponding to the positions within the real space of the plurality of body parts of the player; and
the stop determination determines, in a case where it is determined that at least one of the plurality of body parts has been moved at the speed equal to or faster than the reference speed, whether the at least one of the plurality of body parts that moved at the speed equal to or faster than the reference speed has maintained the substantially stopped state for a period equal to or longer than the reference period, based on the position within the one of the display screen and the virtual space of the at least one of the plurality of body parts corresponding to the position within the real space of the at least one of the plurality of body parts that moved at the speed equal to or faster than the reference speed.

37. A control method for a game device, which control a game configured so that a player aims to locate at least one of a plurality of body parts of the player in a given position at a given time, the control method comprising:
acquiring, from at least one image of a captured region of the player in real space, position information relating to positions of the plurality of body parts of the player in the real space;
acquiring, from a storage, reference data obtained by associating a reference time with a reference position for each body part, wherein the reference data is associated with a reference body part;
determining whether a position of at least one of the plurality of body parts exists within a determination region for the at least one body part using the acquired position information, the determination region being a subset of the captured region comprising the reference position for the at least one body part at a time point corresponding to the reference time;
acquiring body part information relating to a kind of the at least one of the plurality of body parts determined to exist within the determination region;
comparing the kind of body part indicated by the body part information and the reference body part; and
controlling an evaluation of the player based on a result of the comparison,
wherein the position information relating to the positions of the plurality of body parts comprises coordinates of the plurality of body parts in the real space, and the reference position for each body part comprises reference coordinates for each body part at the reference time.

38. A computer-readable non-transitory information storage medium having a program recorded thereon, the program causing a computer to function as a game device, which controls a game configured so that a player aims to locate at least one of a plurality of body parts of the player in a given position at a given time,
the program further causing the computer to:
acquire, from at least one image of a captured region of the player in real space, position information relating to positions of the plurality of body parts of the player in the real space;
acquire reference data from a storage that stores the reference data obtained by associating a reference time with a reference position for each body part, wherein the reference data is associated with a reference body part;
determine whether a position of at least one of the plurality of body parts exists within a determination region for the at least one body part using the acquired position information, the determination region being a subset of the captured region comprising the reference position for the at least one body part at a time point corresponding to the reference time;
acquire body part information relating to a kind of the at least one of the plurality of body parts determined to exist within the determination region;
compare the kind of body part indicated by the body part information and the reference body part; and
control an evaluation of the player based on a result of the comparison,
wherein the position information relating to the positions of the plurality of body parts comprises coordinates of the plurality of body parts in the real space, and the reference position for each body part comprises reference coordinates for each body part at the reference time.

39. The game device according to claim 1, further comprising
a camera that captures an image of the player in the real space, wherein the captured image of the player is used to acquire the position information.

* * * * *